(12) United States Patent
Starr et al.

(10) Patent No.: US 6,996,070 B2
(45) Date of Patent: Feb. 7, 2006

(54) TCP/IP OFFLOAD DEVICE WITH REDUCED SEQUENTIAL PROCESSING

(75) Inventors: Daryl D. Starr, Milpitas, CA (US); Clive M. Philbrick, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 122 days.

(21) Appl. No.: 10/729,111

(22) Filed: Dec. 5, 2003

(65) Prior Publication Data

US 2005/0122986 A1 Jun. 9, 2005

(51) Int. Cl.
*G01R 31/08* (2006.01)
(52) U.S. Cl. .......................... 370/252; 714/15; 714/21
(58) Field of Classification Search ................ 709/231, 709/250; 710/30; 370/252; 714/15, 21
See application file for complete search history.

(56) References Cited

U.S. PATENT DOCUMENTS

| | | | |
|---|---|---|---|
| 4,366,538 A | 12/1982 | Johnson et al. ............. 364/200 |
| 4,589,063 A | 5/1986 | Shah et al. ..................... 710/8 |
| 4,991,133 A | 2/1991 | Davis et al. ................ 364/900 |
| 5,056,058 A | 10/1991 | Hirata et al. ................ 709/230 |
| 5,058,110 A | 10/1991 | Beach et al. ............... 370/85.6 |
| 5,097,442 A | 3/1992 | Ward et al. .................... 365/78 |
| 5,163,131 A | 11/1992 | Row et al. ................... 395/200 |
| 5,212,778 A | 5/1993 | Dally et al. ................. 395/400 |
| 5,280,477 A | 1/1994 | Trapp ........................ 370/85.1 |
| 5,289,580 A | 2/1994 | Latif et al. .................. 395/275 |
| 5,303,344 A | 4/1994 | Yokoyama et al. ......... 395/200 |
| 5,412,782 A | 5/1995 | Hausman et al. ........... 395/250 |
| 5,448,566 A | 9/1995 | Richter et al. ............. 370/94.1 |
| 5,485,579 A | 1/1996 | Hitz et al. ............. 395/200.12 |
| 5,506,966 A | 4/1996 | Ban ............................ 395/250 |
| 5,511,169 A | 4/1996 | Suda .......................... 395/280 |
| 5,524,250 A | 6/1996 | Chesson et al. ............. 395/775 |
| 5,548,730 A | 8/1996 | Young et al. ................ 395/280 |
| 5,566,170 A | 10/1996 | Bakke et al. .................. 370/60 |
| 5,588,121 A | 12/1996 | Reddin et al. ......... 395/200.15 |

(Continued)

FOREIGN PATENT DOCUMENTS

WO WO 98/50852 11/1998

(Continued)

OTHER PUBLICATIONS

EE Times article entitled "Ethernet Interconnect Outpacing Infiniband At Intel", by Rick Merritt, 3 pages, Sep. 12, 2002.

(Continued)

*Primary Examiner*—Bob Phunkulh
*Assistant Examiner*—Robert W. Wilson
(74) *Attorney, Agent, or Firm*—Silicon Edge Law Group, LLP; Mark A. Lauer; T. Lester Wallace

(57) ABSTRACT

A TCP Offload Engine (TOE) device includes a state machine that performs TCP/IP protocol processing operations in parallel. In a first aspect, the state machine includes a first memory, a second memory, and combinatorial logic. The first memory stores and simultaneously outputs multiple TCP state variables. The second memory stores and simultaneously outputs multiple header values. In contrast to a sequential processor technique, the combinatorial logic generates a flush detect signal from the TCP state variables and header values without performing sequential processor instructions or sequential memory accesses. In a second aspect, a TOE includes a state machine that performs an update of multiple TCP state variables in a TCB buffer all simultaneously, thereby avoiding multiple sequential writes to the TCB buffer memory. In a third aspect, a TOE involves a state machine that sets up a DMA move in a single state machine clock cycle.

23 Claims, 24 Drawing Sheets

U.S. PATENT DOCUMENTS

| | | | |
|---|---|---|---|
| 5,590,328 A | 12/1996 | Seno et al. | 395/675 |
| 5,592,622 A | 1/1997 | Isfeld et al. | 395/200.02 |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,692,130 A | 11/1997 | Shobu et al. | 395/200.12 |
| 5,699,317 A | 12/1997 | Sartore et al. | 395/230.06 |
| 5,701,434 A | 12/1997 | Nakagawa | 395/484 |
| 5,701,516 A | 12/1997 | Cheng et al. | 395/842 |
| 5,727,142 A | 3/1998 | Chen | 395/181 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,771,349 A | 6/1998 | Picazo, Jr. et al. | 395/188.01 |
| 5,778,013 A | 7/1998 | Jedwab | 714/807 |
| 5,790,804 A | 8/1998 | Osborne | 709/245 |
| 5,794,061 A | 8/1998 | Hansen et al. | 395/800.01 |
| 5,802,258 A | 9/1998 | Chen | 395/182.08 |
| 5,802,580 A | 9/1998 | McAlpice | 711/149 |
| 5,809,328 A | 9/1998 | Nogales et al. | 395/825 |
| 5,812,775 A | 9/1998 | Van Seters et al. | 395/200.43 |
| 5,815,646 A | 9/1998 | Purcell et al. | 395/163 |
| 5,878,225 A | 3/1999 | Bilansky et al. | 395/200.57 |
| 5,898,713 A | 4/1999 | Melzer et al. | 371/53 |
| 5,913,028 A | 6/1999 | Wang et al. | 395/200.33 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A * | 8/1999 | Connery et al. | 709/250 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,970,804 A | 10/1999 | Robbat, Jr. | 395/200.75 |
| 5,991,299 A | 11/1999 | Radogna et al. | 370/392 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry et al. | 709/303 |
| 6,021,507 A | 2/2000 | Chen | 714/2 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,044,438 A | 3/2000 | Olnowich | 711/130 |
| 6,047,323 A | 4/2000 | Krause | 709/227 |
| 6,047,356 A | 4/2000 | Anderson et al. | 711/129 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,070,200 A | 5/2000 | Gates et al. | 710/20 |
| 6,101,555 A | 8/2000 | Goshey et al. | 709/321 |
| 6,141,705 A | 10/2000 | Anand et al. | 710/15 |
| 6,145,017 A | 11/2000 | Ghaffari | 710/5 |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | |
| 6,202,105 B1 | 3/2001 | Gates et al. | 710/20 |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,298,403 B1 | 10/2001 | Suri et al. | 710/100 |
| 6,334,153 B2 | 12/2001 | Boucher et al. | 709/230 |
| 6,345,301 B1 | 2/2002 | Burns et al. | 709/230 |
| 6,356,951 B1 | 3/2002 | Gentry, Jr. | 709/250 |
| 6,389,468 B1 | 5/2002 | Muller et al. | 709/226 |
| 6,389,479 B1 | 5/2002 | Boucher | 709/243 |
| 6,421,742 B1 | 7/2002 | Tillier | 710/1 |
| 6,427,169 B1 | 7/2002 | Elzur | 709/224 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,480,489 B1 | 11/2002 | Muller et al. | 370/389 |
| 6,526,446 B1 | 2/2003 | Yang et al. | 709/230 |
| 2001/0004354 A1 | 6/2001 | Jolitz | |
| 2001/0013059 A1 | 8/2001 | Dawson et al. | |
| 2001/0014892 A1 | 8/2001 | Gaither et al. | |
| 2001/0014954 A1 | 8/2001 | Purcell et al. | |
| 2001/0025315 A1 * | 9/2001 | Jolitz | 709/231 |
| 2001/0048681 A1 | 12/2001 | Bilic et al. | |
| 2001/0053148 A1 | 12/2001 | Bilic et al. | |
| 2003/0066011 A1 | 4/2003 | Oren | |
| 2003/0165160 A1 | 9/2003 | Minami et al. | |
| 2004/0042464 A1 * | 3/2004 | Elzur et al. | 370/395.52 |
| 2004/0125751 A1 * | 7/2004 | Vangal et al. | 370/252 |
| 2004/0193733 A1 * | 9/2004 | Vangal et al. | 709/250 |
| 2004/0249998 A1 * | 12/2004 | Rajagopalan et al. | 710/30 |

FOREIGN PATENT DOCUMENTS

| | | |
|---|---|---|
| WO | WO 99/04343 | 1/1999 |
| WO | WO 99/65219 | 12/1999 |
| WO | WO 00-13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |

OTHER PUBLICATIONS

Internet pages entitled "Hardware Assisted Protocol Processing", (which Eugene Feinber is working on), 1 page, printed Nov. 25, 1998.

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100 BASE-T Fast Ethernet. 7 pages, printed May 27, 1997.

Internet pages entitled: A Guide to the Paragon XP/S-A7 Supercomputer at Indiana University. 13 pages, printed Dec. 21, 1998.

Richard Stevens, "TCP/IP Illustrated, vol. 1, The Protocols", pp. 325-326 (1994).

Internet pages entitled: Northridge/Southbridge vs. Intel Hub Architecture, 4 pages, printed Feb. 19, 2001.

Gigabit Ethernet Technical Brief, Achieving End-to-End Performance. Alteon Networks, Inc., First Edition, Sep. 1996, 15 pages.

Internet pages directed to Technical Brief on Alteon Ethernet Gigabit NIC technology, www.alteon.com, 14 pages, printed Mar. 15, 1997.

VIA Technologies, Inc. article entitled "VT8501 Apollo MVP4", pp. i-iv, 1-11, cover and copyright page, revision 1.3, Feb. 1, 2000.

iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet-Ready Based On iReady's Design," Press Release Oct., 1998, 3 pages, printed Nov. 28, 1998.
Internet pages from iReady Products, web site http://www.ireadyco.com/products,html, 2 pages, downloaded Nov. 25, 1998.
iReady News Archives, Toshiba, iReady shipping internet chip, 1 page, printed Nov. 25, 1998.
Interprophet article entitled "Technology", http://www.interprophet.com/technology.html, 17 pages, printed Mar. 1, 2000.
iReady Corporation, article entitled "The I-1000 Internet Tuner", 2 pages, date unknown.
iReady article entitled "About Us Introduction", Internet pages from http://www.iReadyco.com/about.html, 3 pages, printed Nov. 25, 1998.
iReady News Archive article entitled "Revolutionary Approach to Consumer Electronics Internet Connectivity Funded", San Jose, CA, Nov. 20, 1997, 2 pages, printed Nov. 2, 1998.
iReady News Archive article entitled "Seiko Instruments Inc. (SII) Introduces World's First Internet-Ready Intelligent LCD Modules Based on iReady Technology," Santa Clara, CA and Chiba, Japan, Oct. 26, 1998. 2 pages, printed Nov. 2, 1998.
NEWSwatch Article entitled "iReady internet Tuner to Web Enable Devices", Tuesday, Nov. 5, 1996, printed Nov. 2, 1998, 2 pages.
EETimes article entitled "Tuner for Toshiba, Toshiba Taps iReady for Internet Tuner", by David Lammers, 2 pages, printed Nov. 2, 1998.
"Comparison of Novell Netware and TCP/IP Protocol Architectures", by J.S. Carbone, 19 pages, printed Apr. 10, 1998.
Adaptec article entitled "AEA-7100C-a DuraSAN product", 11 pages, printed Oct. 1, 2001.
iSCSI HBA article entitled "iSCSI and 2Gigabit fibre Channel Host Bus Adapters from Emulex, QLogic, Adaptec, JNI", 8 pages, printed Oct. 1, 2001.
iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transactions on Networking, vol. 6, No. 6, Dec. 1998, 17 pages.
JReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.
Internet pages of InterProphet entitled "Frequently Asked Questions", by Lynne Jolitz, printed Jun. 14, 2000, 4 pages.
"File System Design For An NFS File Server Appliance", Article by D. Hitz, et al., 13 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.

Adaptec article entitled "EtherStorage White Paper", 7 pages, printed Jul. 19, 2000.
CIBC World Markets article entitled "Computers; Storage", by J. Berlino et al., 9 pages, dated Aug. 7, 2000.
Merrill Lynch article entitled "Storage Futures", by S. Milunovich, 22 pages, dated May 10, 2000.
CBS Market Watch article entitled "Montreal Start-Up Battles Data Storage Bottleneck", by S. Taylor, dated Mar. 5, 2000, 2 pages, printed Mar. 7, 2000.
Internet-draft article entitled "SCSI/TCP (SCSI over TCP)", by J. Satran et al., 38 pages, dated Feb. 2000, printed May 19, 2000.
Internet pages entitled Technical White Paper-Xpoint's Disk to LAN Acceleration Solution for Windows NT Server, printed Jun. 5, 1997, 15 pages.
Jato Technologies article entitled Network Accelerator Chip Architecture, twelve-slide presentation, printed Aug. 19, 1998, 13 pages.
EETimes article entitled Enterprise System Uses Flexible Spec, dated Aug. 10, 1998, printed Nov. 25, 1998, 3 pages.
Internet pages entitled "Smart Ethernet Network Interface Cards", which Berend Ozceri is developing, printed Nov. 25, 1998.
Internet pages of Xaqti corporation entitled "GigaPower Protocol Processor Product Review," printed Nov. 25, 1999, 4 pages.
Internet pages entitled "DART: Fast Application Level Networking via Data-Copy Avoidance," by Robert J. Walsh, printed Jun. 3, 1999, 25 pages.
Schwaderer et al., IEEE Computer Society Press publication entitled "XTP in VLSI Protocol Decomposition for ASIC Implementation", from 15th Conference on Local Computer Networks, 5 pages, Sep. 30-Oct. 3, 1990.
Beach, Bob, IEEE Computer Society Press publication entitled, "UltraNet: An Architecture for Gigabit Networking", from 15th Conference on Local Computer Networks, 18 pages, Sep. 30-Oct. 3, 1990.
Chesson et al., IEEE Symposium Record entitled, "The Protocol Engine Chipset", from Hot Chips III, 16 pages, Aug. 26-27, 1991.
Maclean et al., IEEE Global Telecommunications Conference, Globecom '91, presentation entitled "An Outboard Processor for High Performance Implementation of Transport Layer Protocols", 7 pages, Dec. 2-5, 1991.
Ross et al., IEEE article entitled "FX1000: A high performance single chip Gigabit Ethernet NIC", from Compcon '97 Proceedings, 7 pages, Feb. 23-26, 1997.
Strayer et al., "Ch. 9: The Protocol Engine" from XTP: The Transfer Protocol, 12 pages, Jul. 1992.
Publication entitled "Protocol Engine Handbook", 44 pages, Oct. 1990.
Koufopavlou et al., IEEE Global Telecommunications Conference, Globecom '92, presentation entitled, "Parallel TCP for High Performance Communication Subsystems", 7 pages, Dec. 6-9, 1992.
Lillienkamp et al., Publication entitled "Proposed Host-Front End Protocol", 56 pages, Dec. 1984.

* cited by examiner

| BLOCK | DESCRIPTION |
|---|---|
| RcvMac | RECEIVE MEDIA ACCESS CONTROLLER |
| RcvPrs | RECEIVE PARSER. |
| SktDet | SOCKET DETECTOR. |
| RcvMgr | RECEIVE MANAGER. |
| SktEng | SOCKET ENGINE. |

FIG. 3

| MEMORY | FORMAT | | DESCRIPTION |
|---|---|---|---|
| HdrBuf | [HdrId ]{ PrsHd , PktHd | } | HEADER BUFFER. |
| RcvMac | [BufId ]{ PrsHd , RcvPk | } | RECEIVE PACKET BUFFER. |
| SktDscBuf | [TcbId ]{ SktDsc , DetEn | } | SOCKET DESCRIPTOR BUFFER. |
| MgrBuf | [TcbId ]{ EvtEn | } | RECEIVE MANAGEMENT CONTROL. |
| TcbBuf | [TcbId ]{ SkTpl , MdlVd , ApDsc , * | } | TCB BUFFER (ASTERISK INDICATES ADDITIONAL VALUES - SEE FIG. 20) |
| HstMem | [MsgAd ]{ MsgHd , MsgDt | } | HOST MEMORY. |
| | [CmdAd ]{ CmdHd , CmdDt | } | |
| | [TcbAd ]{ SktDsc , SkTpl , SktHdr | } | |
| | [ApDsc ]{ Data | } | |
| RcvBufQ | {BufId | } | QUEUE OF FREE DRAM RECEIVE BUFFERS. |
| RcvMacQ | {RcvPk , RcvSt | } | RECEIVE PACKET BUFFERING QUEUE |
| PrsEvtQ | {PkEnd , SkHsh , SktDsc | } | PARSE EVENT QUEUE. |
| DetCmdQ | {EnbCd , TcbId | } | SOCKET DETECTOR COMMAND QUEUE. |
| | {DblCd , TcbId | } | |
| DetEvtQ | {EnbCd , TcbId | } | SOCKET DETECTOR EVENT QUEUE. |
| | {DblCd , TcbId | } | |
| | {SlwCd , HdrCd , PkEnd | } | |
| | {FstCd , HdrCd , PkEnd , TcbId | } | |
| MgrCmdQ | {ArmCd , TcbId | } | RECEIVE MANAGER COMMAND QUEUE. |
| | {ClrCd , TcbId | } | |
| | {PshCd , TcbId | } | |
| | {ReqCd , TcbId | } | |
| SktRcvQ | {HdrCd , PkEnd , HdrCd , PkEnd | } | RECEIVE DESCRIPTOR QUEUES (ONE PER TCB). |
| SlwEvtQ | {EnbCd , TcbId | } | SLOW RECEIVE QUEUE. |
| | {DblCd , TcbId | } | |
| | {SlwCd , HdrCd , PkEnd | } | |
| FstEvtQ | {ClrCd , TcbId | } | FAST RECEIVE QUEUE. |
| | {FstCd , TcbId , HdrId | } | |
| HdrEvtQ | {TcbId | } | NOTIFY SKT ENG OF HEADER IN HDR BUFFER. |
| HstEvtQ | {CmdAd , TcbId | } | SOCKET ENGINE COMMAND QUEUE. |
| MsgBufQ | {MsgAd | } | QUEUE OF FREE HOST MESSAGE BUFFERS. |

FIG. 4

| MNEMONIC | DESCRIPTION |
|---|---|
| EngCx | SOCKET ENGINE CONTEXT. |
| HdSel | CONTEXT HEADER BUFFER SELECT. |
| TcbId | TCB BUFFER IDENTIFIER. |
| BufId | RECEIVE BUFFER IDENTIFIER. |
| HdrId | HEADER BUFFER IDENTIFIER. |
| CmdAd | HOST COMMAND ADDRESS. |
| MsgAd | HOST MESSAGE ADDRESS. |
| TcbAd | ADDRESS OF TCB BUFFER ON THE HOST. |
| ApDsc | APPLICATION BUFFER ADDRESS (STORED IN TCB BUF). |
| MsgHd | MESSAGE HEADER (MESSAGES ARE SENT FROM NID TO HOST)(INCLUDES A TCBID). |
| CmdHd | COMMAND HEADER (COMMANDS ARE SENT FROM HOST TO NID). |
| MsgDt | MESSAGE DATA. |
| CmdDt | COMMAND DATA. |
| SkHdr | PROTOTYPE TRANSMIT HEADER. |
| LnkHd | LINK HEADER. |
| SnpHd | 802.3 SNAP HEADER. |
| VldHd | VLAN HEADER. |
| NetHd | NETWORK HEADER |
| TptHd | TRANSPORT HEADER. |
| PayLd | PACKET PAYLOAD. |
| PktHd | PACKET HEADER. |
| RcvSt | RECEIVE MAC PACKET STATUS (GENERATED BY RECEIVE MAC). |
| NetIx | NETWORK HEADER START INDEX. |
| TptIx | TRANSPORT HEADER START INDEX. |
| DdpIx | DDP HEADER START INDEX. |
| PkLen | PACKET LENGTH. |
| PkEnd | RECEIVE BUFFER ENDING ADDRESS. |
| SkHsh | SOCKET HASH {TCB[N-1:03]} |
| PrsSt | PACKET PARSE STATUS. |
| DetEn | SOCKET DETECTION ENABLE BIT. |
| MdlVd | MEMORY DESCRIPTOR VALID (STORED IN TCB BUF). |
| HdrCd | HEADER LENGTH CODE. |
| SrcPt | TRANSPORT SOURCE PORT. |
| DstPt | TRASNPORT DESTINATION PORT. |
| SrcAd | NETWORK SOURCE ADDRESS. |
| DstAd | NETWORK DESTINATION ADDRESS. |
| EnbCd | RECEIVE ENABLE CODE (2-BITS). |
| DblCd | RECEIVE DISABLE CODE. |
| ArmCd | RECEIVE ARM CODE (SENT FROM SKT ENG TO RCV MGR). |
| ClrCd | RECEIVE DISARM CODE. |
| PshCd | RECEIVE PACKET RETURN CODE. |
| SlwCd | RECEIVE SLOW PATH CODE. |
| FstCd | RECEIVE FAST PATH CODE. |
| ReqCd | REQUEST CODE (TO TELL RCVMGR TO PUT HEADERS INTO HEADER BUFFER). |
| EvtEn | RECEIVE EVENT ENABLE BIT (STORED IN MGR BUF). |
| SkTpl | SOCKET TUPLE. |
| RcvPk | RECEIVE PACKET. |
| PrsHd | PARSE HEADER (GENERATED BY RECEIVE PARSER). |
| SktDsc | SOCKET DESCRIPTOR. |
| EvtCd | EVENT CODE (FOR FstEvtQ IT CAN EITHER BE FstCd OR ClrCd). (FOR SlwEvtQ IT CAN EnbCd, DblCd, or SlwCd). |

FIG. 5

| MNEMONIC | FORMAT |
|---|---|
| SkTpl | { XmtAckNum, XmtSeqNum, XmtSeqLmt, XmtCcwSz, MaxSegSz, MaxXmtWin, RcvSeqLmt, ExpRcvSeq, ExpHdrLen, TcbAd } |
| HdrId | { EngCx, HdSel } |
| TplUpd | { PktAckNum, NxtSeqMax, NxtCcwSz, NxtExpSeq } |
| RcvPk | { PktHd, PayLd } |
| PktHd | { LnkHd, SnpHd, VlnHd, NetHd, TptHd } |
| PrsHd | { PktBufId, HdrCd, PktPaySz, NetIx, TptIx, DdpIx, PkEnd, PrsSt * } |
| SktDsc | { HdrCd, SrcPt, DstPt, SrcAd, DstAd, DetEn } |
| PkEnd | { BufId, PkLen } |
| NetHd | { PktSrcAdr, PktDstAdr, * } |
| TptHd | { PktRcvSeq, PktXmtAck, PktXmtWin, PktSrcPrt, PktDstPrt, * } |

\* = INCLUDES OTHER VARIABLES NOT LISTED

FIG. 6

```
(700)  RcvMac
(701)  parse   RcvPk
(702)  write   RcvMacQ         { RcvPk                        }  // FORWARD RECEIVE PACKET.
(703)  write   RcvMacQ         { RcvSt                        }  // APPEND STATUS.

(704)  RcvPrs
(705)  read    RcvBufQ         { BufId                        }  // GET A RECEIVE BUFFER.
(706)  parse   RcvMacQ         { RcvPk    , RcvSt             }  // PARSE A PACKET.
(707)  write   RcvBuf  [BufId] { PrsHd    , RcvPk             }  // SAVE PACKET AND PARSE INFO.
(708)  write   PrsEvtQ         { PkEnd    , SkHsh  , SktDsc   }  // SEND EVENT DESCRIPTOR.

(709)  SktDet
(710)  read    PrsEvtQ            { PkEnd   , SkHsh   , SktDsc  }   // GET EVENT DESCRIPTOR.
(711)  test    SktDscBuf [SkHsh]  { SktDsc  , .....   SktDsc  } , SktDsc  // SEE IF FAST PATH.
(712)  write   DetEvtQ            { SlwCd   , HdrCd   , PkEnd   }   // SEND SLOW DESCRIPTOR.

(713)  RcvMgr
(714)  read    DetEvtQ         { SlwCd    , HdrCd  , PkEnd    }  // GET SLOW DESCRIPTOR.
(715)  write   SlwEvtQ         { SlwCd    , HdrCd  , PkEnd    }  // PASS TO SktEng.

(716)  SktEng
(717)  read    SlwEvtQ         { SlwCd    , HdrCd  , PkEnd    }  // GET SLOW DESCRIPTOR.
(718)  read    MsgBufQ         { MsgAd                        }  // GET HOST BUFFER.
(719)  copy    RcvBuf  [BufId] { PrsHd    , RcvPk             } , HstMem[MsgAd]  // COPY PACKET.
(720)  write   HstMem  [MsgAd] { MsgHd                        }  // NOTIFY HOST.
(721)  write   RcvBufQ         { BufId                        }  // RECYCLE RECEIVE BUFFER.
```

SLOW PATH RECEIVE SEQUENCE

FIG. 7

```
        FIRST PHASE (SLOW-PATH PURGE)

(800) Host
(801) write    HstMem  [CmdAd]  { CmdHd , TcbAd }          // WRITE RECEIVE COMMAND.
(802) write    HstEvtQ          { CmdAd , TcbId }          // SEND COMMAND NOTICE.

(803) SktEng
(804) read     HstEvtQ          { CmdAd , TcbId }          // GET NOTICE COMMAND.
(805) read     HstMem  [CmdAd]  { CmdHd , TcbAd }          // LOAD EnbSk COMMAND.
(806) copy     HstMem  [TcbAd]  { SktDsc         }, SktDscBuf [TcbId]  // LOAD SOCKET DESCRIPTOR.
(807) write    DetCmdQ          { EnbCd , TcbId }          // SEND DETECT ENABLE COMMAND.

(808) SktDet
(809) read     DetCmdQ            { EnbCd , TcbId }        // GET DETECT ENABLE COMMAND.
(810) set      SktDscBuf [TcbId]  { DetEn          }        // ENABLE SOCKET DETECTION.
(811) write    DetEvtQ            { EnbCd , TcbId }        // SEND PURGE MARKER.

(812) RcvMgr
(813) read     DetEvtQ          { EnbCd , TcbId }          // GET PURGE MARKER.
(814) write    SlwEvtQ          { EnbCd , TcbId }          // SEND TO SOCKET ENGINE.

(815) SktEng
(816) read     SlwEvtQ          { EnbCd , TcbId }          // GET PURGE MARKER.
(817) read     MsgBufQ          { MsgAd         }          // GET A HOST MESSAGE BUFFER.
(818) write    HstMem  [MsgAd]  { MsgHd         }          // NOTIFY HOST OF COMMAND DONE.
                                                              (THE MsgHd INDICATES AN ENABLE
                                                              MARK MESSAGE EnbMrkMsg.)

SECOND PHASE (LOAD SOCKET STATE)

(819) Host
(820) read     HstMem  [MsgAd]  { MsgHd         }          // GET MESSAGE THAT PRIOR COMMAND IS DONE.
(821) write    HstMem  [TcbAd]  { SkTpl         }          // WRITE SOCKET STATE.
(822) write    HstMem  [CmdAd]  { CmdHd , TcbAd }          // WRITE RECEIVE COMMAND.
(823) write    HstEvtQ          { CmdAd , TcbId }          // SEND COMMAND NOTICE.

(824) SktEng
(825) read     HstEvtQ          { CmdAd , TcbId }          // GET NOTICE COMMAND.
(826) read     HstMem  [CmdAd]  { CmdHd , TcbAd }          // LOAD HOST COMMAND.
(827) copy     HstMem  [TcbAd]  { SkTpl         }, TcbBuf [TcbId]   // MOVE SOCKET STATE TO NID.
(828) write    MgrCmdQ          { ArmCd , TcbId }          // SEND ARM COMMAND TO RCV MGR.

(829) RcvMgr
(830) read     MgrCmdQ          { ArmCd , TcbId }          // GET ARM COMMAND.
(831) if       (SktRcvQRdy[TcbId])
(832)   write  FstEvtQ [TcbAd]  { FstCd , TcbId }          // PUT FAST-PATH EVENT TO SKT ENG.
(833) else
(834)   set    MgrBuf  [TcbId]  { EvtEn         }          // SET EVENT ENABLE BIT SO NEXT
                                                              TIME A FAST-PATH DESCRIPTOR
                                                              APPREARS ON SKT RCV QUEUE, IT
                                                              WILL BE PASSED TO SOCKET
                                                              ENGINE AS A FAST-PATH EVENT.
```

CONNECTION HANDOUT SEQUENCE

FIG. 8

```
(900)  RcvMac
(901)  parse  RcvPk
(902)  write  RcvMacQ          { RcvPk                      }      // FORWARD RECEIVE PACKET.
(903)  write  RcvMacQ          { RcvSt                      }      // APPEND STATUS.

(904)  RcvPrs
(905)  read   RcvBufQ          { BufId                      }      // GET A RECEIVE BUFFER.
(906)  parse  RcvMacQ          { RcvPk , RcvSt              }      // PARSE A PACKET.
(907)  write  RcvBuf  [BufId]  { PrsHd , RcvPk              }      // SAVE PACKET AND PARSE INFO.
(908)  write  PrsEvtQ          { PkEnd , SkHsh , SktDs_c    }      // SEND EVENT DESCRIPTOR.

(909)  SktDet
(910)  read   PrsEvtQ          { PkEnd , SkHsh , SktDs      } SktDs  // GET EVENT DESCRIPTOR.
(911)  test   SktDscBuf [SkHsh] { SktDs , .... , SktDs      }, c     // SEE IF FAST-PATH FRAME.
(912)  write  DetEvtQ          { FstCd , HdrCd , PkEnd      }      // SEND FAST DESCRIPTOR.
(913)  write  DetEvtQ          { TcbId ,                    }

(914)  RcvMgr
(915)  read   DetEvtQ          { FstCd , HdrCd , PkEnd      }      // GET FAST DESCRIPTOR.
(916)  read   DetEvtQ          { TcbId                      }
(917)  write  SktRcvQ [TcbId]  { SlwCd , HdrCd , PkEnd      }      // SAVE TO SOCKET QUEUE.
(918)  if     (MgrBuf[TcbId]{EvtEn}) begin
(919)  write  FstEvtQ          { FstCd , TcbId              }      // SEND FAST EVENT NOTICE.
(920)  clr    MgrBuf  [TcbId]  { EvtEn                      }      // CLR EVENT ENABLE.
(921)  end (922)  SktEng
(923)  read   FstEvtQ          { FstCd , TcbId              }      // GET FAST EVENT NOTICE.
(924)  write  MgrCmdQ          { ReqCd , HdrId , TcbId      }      // REQUEST HEADER DELIVERY.

(925)  RcvMgr
(926)  read   MgrCmdQ          { ReqCd , HdrId , TcbId      }      // GET HEADER REQUEST.
(927)  read   SktRcvQ [TcbId]  { SlwCd , HdrCd , PkEnd      }      // GET RCV DESCRIPTOR
(928)  copy   RcvBuf  [BufId]  { PrsHd , PktHd              }, HdrBuf [HdrId] // GET FAST HEADERS.
(929)  write  HdrEvtQ          { TcbId                      }      // SEND HEADER EVENT.

(930)  SktEng
(931)  read   HdrEvtQ          { TcbId                      }      // GET HEADER EVENT.

(932)  Check  packet ack win and seq;
(933)  test   HdrBuf  [HdrId]  against TcbBuf[TcbId]                // CHECK ACK, WINDOW AND SEQ.

(934)  if (TcbBuf [TcbId]{MdlVd}) begin                             // IF VALID MEM DESCRIPTOR.
(935)     read   HdrBuf  [HdrId]  { BufId  }                        // GET SOURCE POINTER.
(936)     read   TcbBuf  [TcbId]  { ApDsc  }                        // GET DESTINATION POINTER.
(937)     copy   RcvBuf  [BufId]  { PayLd  } , HstMem[ApDsc] //   MOVE FAST DATA.
(938)     read   MsgBufQ          { MsgAd  }                        // GET A HOST BUFFER.
(939)     write  HstMem [MsgAD]   { MsgHd  }                        // SEND RESPONSE MESSAGE.
(940)     write  RcvBufQ          { BufId  }                        // RECYCLE MDL VALID BIT.
(941)     clear  TcbBuf  [TcbId]  { MdlVd  }                        // CLEAR MDL VALID BIT.
(942)  end
```

FAST-PATH RECEIVE SEQUENCE

FIG. 9A

```
(943)  else  begin                              // IF NO VALID MEMORY DESCRIPTOR, SEND INITIAL DATA.
(944)     read    MsgBufQ         { MsgAd }                   // GET A HOST BUFFER.
(945)     copy    RcvBuf   [BufId] { PayLd }                  // COPY FAST DATA.
(946)     write   HstMem   [MsgAd] { MsgHd } , HstMem[MsgAd]  // REQUEST MEMORY DESCRIPTOR.
(947)     write   RcvBufQ         { BufId }                   // RECYCLE RECEIVE BUFFER.

(948) Host
(949)     read    HstMem   [MsgAd] { MsgHd , MsgDt }          // GET RECEIVE REQUEST.
(950)     write   HstMem   [CmdAd] { CmdHd , ApDsc }          // WRITE RECEIVE COMMAND.
(951)     write   HstEvtQ          { CmdAd , TcbId }          // SEND COMMAND NOTICE.

(952) SktEng
(953)     read    HstEvtQ          { CmdAd , TcbId }                   // GET COMMAND NOTICE.
(954)     copy    HstMem   [CmdAd] { CmdHd , ApDsc } , TcbBuf [TcbId]  // LOAD RECEIVE COMMAND.
(955)     set     TcbBuf   [TcbId] { MdlVd , }                         // SET VALID BIT.
(956)     write   MgrCmdQ          { ArmCd , TcbId }                   // LOAD RECEIVE COMMAND.
                                   }
(957) RcvMgr
(958)     read    MgrCmdQ          { ArmCd, TcbId }           // GET ARM COMMAND.
(959)     if (SktRcvQRdy [TcbId])
(960)       write  FstEvtQ         { FstCd , TcbId }          // SEND NOTICE TO SKT ENG.
(961)  end
```

FAST-PATH RECEIVE SEQUENCE (CONTINUED)
FIG. 9B

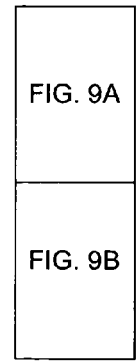

KEY TO FIG. 9

```
(1000) Idle:  if (SlwEvtQRdy) begin                       // SERVICE SLOW EVENT QUEUE.
(1001)           if (SlwEvtQ {EvtCd} == 0) begin          // SLOW RECEIVE EVENT.
(1002)              EState   <= SlwRcvEvt;                // GO TO EVENT SERVICE.
(1003)              ETcbId   <= SlwEvtQ{TcbId};           // SAVE TCB NUMBER.
(1004)              ECmdAd   <= x;                        //
(1005)              EHdrCd   <= SlwEvtQ{HdrCd};           // SAVE HEADER DMA LENGTH.
(1006)              EHdrAd   <= x;                        //
(1007)              EBufId   <= SlwEvtQ{BufId};           // SAVE RECEIVE BUFFER NUMBER.
(1008)              EPkLen   <= SlwEvtQ{PkLen};           // SAVE RECEIVE BUFFER LENGTH.
(1009)           end (1010)           else if (SlwEvtQ {EvtCd} == 1) begin     // SLOW MARK EVENT.
(1011)              EState   <= EnbMrkEvt;                // GO TO EVENT SERVICE.
(1012)              ETcbId   <= SlwEvtQ{TcbId};           // SAVE TCB NUMBER.
(1013)              EcmdAd   <= x;                        //
(1014)              EHdrCd   <= x;                        //
(1015)              EHdrAd   <= x;                        //
(1016)              EBufId   <= x;                        //
(1017)              EPkLen   <= x;                        //
(1018)           end (1019)           else begin                               // DISABLE MARK EVENT.
(1020)              EState   <= DblMrkEvt;                // GO TO EVENT SERVICE.
(1021)              ETcbId   <= SlwEvtQ{TcbId};           // SAVE TCB NUMBER.
(1022)              EcmdAd   <= x;                        //
(1023)              EHdrCd   <= SlwEvtQ{HdrCd};           // SAVE HEADER DMA LENGTH.
(1024)              EHdrAd   <= x;                        //
(1025)              EBufId   <= SlwEvtQ{BufId};           // SAVE RECEIVE BUFFER NUMBER.
(1026)              EPkLen   <= SlwEvtQ{PkLen};           // SAVE RECEIVE BUFFER LENGTH.
(1027)           end
(1028)        end (1029)        else if (FstEvtQRdy) begin                  // SERVICE FAST EVENT QUEUE.
(1030)           if (FstEvtQ {EvtCd} == 0) begin          // FAST RECEIVE EVENT (EvtCd is the FstCd).
(1031)              EState   <= FstRcvEvt;                // GO TO EVENT SERVICE.
(1032)              ETcbId   <= FstEvtQ{TcbId};           // SAVE TCB NUMBER.
(1033)              EcmdAd   <= x;                        //
(1034)              EHdrCd   <= x;                        //
(1035)              EHdrAd   <= FstEvtQ{HdrId};           // SAVE HEADER BUFFER POINTER.
(1036)              EBufId   <= x;                        //
(1037)              EPkLen   <= x;                        //
(1038)           end (1039)           else begin                               // CLEAR MARK EVENT (EvtCd is the ClrCd).
(1040)              EState   <= ClrMrkEvt;                // GO TO EVENT SERVICE.
(1041)              ETcbId   <= FstEvtQ{TcbId};           // SAVE TCB NUMBER.
(1042)              EcmdAd   <= x;                        //
(1043)              EHdrCd   <= x;                        //
(1044)              EHdrAd   <= FstEvtQ{HdrId};           // SAVE HEADER BUFFER POINTER.
(1045)              EBufId   <= x;                        //
(1046)              EPkLen   <= x;                        //
(1047)           end
(1048)        end
```

SOCKET ENGINE STATES

FIG. 10A

```
(1049)   else if (HstEvtQRdy) begin              // SERVICE HOST EVENT QUEUE.
(1050)        EState    <= SktCmdEvt;            // GO TO EVENT SERVICE.
(1051)        ETcbId    <= HstEvtQ{TcbId};       // SAVE TCB NUMBER.
(1052)        EcmdAd    <= HstEvtQ{CmdAd};       // SAVE COMMAND BLOCK ADDRESS.
(1053)        EHdrCd    <= x;                    //
(1054)        EHdrAd    <= x;                    //
(1055)        EBufId    <= x;                    //
(1056)        EPkLen    <= x;                    //
(1057)   end (1058)   else if (HdrEvtQRdy) begin              // SERVICE HEADER EVENT QUEUE.
(1059)        EState    <= HdrDmaEvt;            // GO TO EVENT SERVICE.
(1060)        ETcbId    <= HdrEvtQ{TcbId};       // SAVE TCB NUMBER IN ETcbId (MAKES
(1061)        EcmdAd    <= x;                    //   ALL THE BITS OF THE TCB SIMULTANEOUSLY
(1062)        EHdrCd    <= x;                    //   AVAILABLE TO THE SKT ENG.)
(1063)        EHdrAd    <= HdrEvtQ{HdrId};       // SAVE HEADER BUFFER POINTER IN EHdrAd
(1064)        EBufId    <= x;                    //   (MAKES ALL THE BITS OF THE HEADER BUFFER
(1065)        EPkLen    <= x;                    //   SIMULTANEOUSLY AVAILABLE TO THE SKT ENG.)
(1066)   end (1067)   else begin                              // NO EVENT TO SERVICE.
(1068)        EState    <= Idle;                 // KEEP CHECKING FOR WORK.
(1069)        ETcbId    <= HdrEvtQ{TcbId};       //
(1070)        EcmdAd    <= x;                    //
(1071)        EHdrCd    <= x;                    //
(1072)        EHdrAd    <= x;                    //
(1073)        EBufId    <= x;                    //
(1074)        EPkLen    <= x;                    //
(1075)   end (1076)   // Slow Path Receive Event.
(1077)   SlwRcvEvt: begin                        // DMA SLOW-PATH PACKET TO HOST.
(1078)        EState       <= SlwRcv0;           // SET NEXT STATE.
(1079)        EMsgAd       <= MsgBufQ{MsgAd};    // GET HOST BUFFER.
(1080)        DrmAd        <= EBufId<<11;        // DRAM SOURCE ADDRESS.
(1081)        HstAd        <= MsgBufQ{MsgAd} + MsgHdLen;   // HOST DESTINATION ADDRESS.
(1082)        HstSz        <= EPkLen;            // DMA LENGTH.
(1083)        HstDmaCmd    <= R2hCd;             // MOVE RCV BUFFER TO HOST DMA.
(1084)   end (1085)   SlwRcv0: begin                          // SEND HOST NOTIFICATION MESSAGE.
(1086)        EState       <= Idle;              // GO FIND WORK.
(1087)        E2hBuf       <= SlwRcvMsg;         // SET UP SLOW RECEIVE MESSAGE.
(1088)        HstAd        <= EMsgAd;            // HOST DESTINATION ADDRESS.
(1089)        HstSz        <= MsgHdLen;          // DMA LENGTH.
(1090)        HstDmaCmd    <= E2hCd;             // MOVE MESSAGE TO HOST.
(1091)        RcvBufQ      <= EBufId;            // RECYCLE RECEIVE BUFFER.
(1092)   end
```

SOCKET ENGINE STATES (CONTINUED)

FIG. 10B

```
(1093)  // Slow-Path Purge Event (Socket Detection Enabled).
(1094)     EnbMrkEvt: begin              // NOTIFY HOST FIRST PHASE OF HANDOUT IS DONE.
(1095)        EState      <= Idle;        // GO FIND WORK.
(1096)        EMsgAd      <= MsgBufQ{MsgAd};  // GET HOST MESSAGE BUFFER ADDRESS.
(1097)        E2hBuf      <= EnbMrkMsg;   // PREPARE AN ENABLE-MARK MESSAGE.
(1098)        HstAd       <= MsgBufQ{MsgAd};  // SET HOST DESTINATION ADDRESS.
(1099)        HstSz       <= MsgHdLen;    // SET DMA LENGTH.
(1100)        HstDmaCmd   <= E2hCd;       // MOVE MESSAGE TO HOST MESSAGE BUFFER.
(1101)     end (1102)  // Descriptor Buffer Release Event (Socket Detection Disabled).
(1103)     DblMrkEvt: begin              // DISABLE MARK EVENT.
(1104)        EState      <= DblMrk0;    // GO TO DISABLE SERVICE.
(1105)        EMsgAd      <= MsgBufQ{MsgAd};  // GET HOST BUFFER.
(1106)     end (1107)     DblMrk0: begin                // NOTIFY HOST.
(1108)        EState      <= Idle;        // GO FIND WORK.
(1109)        E2hBuf      <= DblMrkMsg;  // DISABLE-MARK MESSAGE.
(1110)        HstAd       <= EMsgAd;     // HOST DESTINATION ADDRESS.
(1111)        HstSz       <= MsgHdLen;   // DMA LENGTH.
(1112)        HstDmaCmd   <= E2hCd       // DO NID TO HOST DMA.
(1113)     end (1114)  // Fast-Path Receive Event.
(1115)     FstRcvEvt: begin              // GET FAST PACKET HEADER.
(1116)        EState      <= Idle;        // GO FIND WORK.
(1117)        MgrCmdQ     <= {ReqCd, PktId, ETcbId}  // REQUEST HEADER DELIVERY.
(1118)     end (1119)  // Fast-Receive Purge Event (Fast Event Disabled).
(1120)     ClrMrkEvt: begin              // GO TO NEXT STATE.
(1121)        EState      <= ClrMrk0;    // GO TO NEXT STATE.
(1122)        EMsgAd      <= MsgBufQ{MsgAd};  // GET MESSAGE BUFFER ON HOST.
(1123)        HstTcbId    <= ETcbId;     // SOURCE IS TCB BUFFER.
(1124)        HstAd       <= TcbBuf{TcbAd};  // DESTINATION ON HOST.
(1125)        HstSz       <= SkTplLen;   // DMA LENGTH.
(1126)        HstDmaCmd   <= T2hCd;      // MOVE TCB FROM NID TO HOST.
(1127)        DetCmdQ     <= {DblCd, ETcbId};  // SEND DISABLE COMMAND TO SKT DET.
(1128)     end (1129)     ClrMrk0: begin                // NOTIFY HOST THAT STATE HAS BEEN EXPORTED.
(1130)        EState      <= Idle;        // GO FIND WORK.
(1131)        E2hBuf      <= ExportMsg;  // STATE EXPORT MESSAGE INTO E2HBUF.
(1132)        HstAd       <= EMsgAd;     // DESTINATION ADDRESS ON HOST.
(1133)        HstSz       <= MsgHdLen;   // DMA LENGTH.
(1134)        HstDmaCmd   <= E2hCd;      // MOVE MESSAGE FROM NID TO HOST.
(1135)     end (1136)  // Host Command Entry Event.
(1137)     SktCmdEvt: begin              // GET COMMAND FROM HOST.
(1138)        EState      <= SktCmd0;    // SET NEXT STATE.
(1139)        HstAd       <= ECmdAd;     // SET HOST SOURCE ADDRESS.
(1140)        HstSz       <= CmdHdLen;   // SET DMA LENGTH.
(1141)        HstDma Cmd  <= H2eCd;      // MOVE COMMAND FROM HOST TO NID.
(1142)     end
```

SOCKET ENGINE STATES (CONTINUED)
FIG. 10C

```
(1143)  SktCmd0: if (H2eBuf {CmdCd} = = 0) begin    // IF ENABLE COMMAND.
(1144)      EState        <= SktEnbCmd;            // GO TO ENABLE ROUTINE.
(1145)      end (1146)      else if (H2eBuf {CmdCd} = = 1) begin   // IF ARM COMMAND.
(1147)      EState        <= SktArmCmd;            // GO TO ARM ROUTINE.
(1148)      end (1149)      else begin                             // MUST BE RCV COMMAND.
(1150)      EState        <= SktRcvCmd;            // GO TO ARM ROUTINE.
(1151)      end (1152)  // Socket Enable Command Service.
(1153)  SktEnbCmd: begin                           // GET SOCKET DESCRIPTOR.
(1154)      EState        <= SktEnb0;              // GO TO NEXT STATE.
(1155)      DscBufAd      <= ETcbId * SktDscLen;   // ADDR FOR SktDsc BUFFER.
(1156)      HstAd         <= H2eBuf {TcbAd} + SktDsclx; // HOST SktDsc ADDRESS.
(1157)      HstSz         <= SktDscLen;            // DMA LENGTH.
(1158)      HstDmaCmd     <= H2dCd;                // MOVE SkDsc FROM HOST TO NID.
(1159)      end (1160)  SktEnb0: begin                             // ENABLE SOCKET DETECTION.
(1161)      EState        <= Idle;                 // GO FIND WORK.
(1162)      DetCmdQ       <= {EnbCd, ETcbId};      // SEND ENABLE COMMAND.
(1163)      end (1164)  // Socket Arm Command Service.
(1165)  SktArmCmd: begin                           // GET SOCKET STATE.
(1166)      EState        <= SktArm0;              // GO TO NEXT STATE.
(1167)      TcbBufAd      <= ETcbId * TcbBufLen;   // ADDR FOR SktDsc BUFFER.
(1168)      HstAd         <= H2eBuf {TcbAd} + SkTpllx;// HOST SktTpl ADDRESS.
(1169)      HstSz         <= SkTplLen;             // DMA LENGTH.
(1170)      HstDmaCmd     <= H2tCd;                // MOVE SkTpl FROM HOST TO NID.
(1171)      end (1172)  SktArm0: begin                             // ENABLE SOCKET RECEIVE.
(1173)      EState        <= Idle;                 // GO FIND WORK.
(1174)      MgrCmdQ       <= ArmCd, ETcbId};       // SEND ARM RECEIVE COMMAND.
(1175)      end (1176)  // Socket Receive Command Service.
(1177)  SktRcvCmd: begin                           // GET APPLICATION BUFFER DSC.
(1178)      EState        <= SktRcv0;              // GO TO NEXT STATE.
(1179)      TcbBufAd      <= (ETcbId * TcbBufLen) + ApDsclx;  // ADDR FOR APP DSC BUFFER.
(1180)      HstAd         <= ECmdAd + ApDsclx;     // HOST ApDsc ADDRESS.
(1181)      HstSz         <= ApDscLen;             // DMA LENGTH.
(1182)      HstDmaCmd     <= H2tCd;                // MOVE ApDsc FROM HOST TO NID.
(1183)      end (1184)  SktRcv0: begin                             // ENABLE SOCKET RECEIVE.
(1185)      EState        <= Idle;                 // GO FIND WORK.
(1186)      TcbBuf{RSqMx} <= TcbBuf{RSqMx}+H2eBuf{SqInc};  // INCREMENT RECEIVE WINDOW.
(1187)      MgrCmdQ       <= {ArmCd, ETcbId};      // SEND ARM RECEIVE COMMAND.
(1188)      MdlVd[ETcbId] <= 1;                    // ADDR FOR MDL VALID BIT.
(1189)      end
```

SOCKET ENGINE STATES (CONTINUED)

FIG. 10D

```
(1190) // Header Event Service.
(1191)   HdrDmaEvt: begin
(1192)            EState        <= HdrEvt0;              // GO TO NEXT STATE.
(1193)            EMsgAd        <= MsgBufQ {MsgAd};       // GET HOST BUFFER.
(1194)            EFlush        <= FlushDet;             // FLUSH DETECT - PARALLEL OPERATION
(1195)            EBufId        <= HdrBuf{BufId};        // SAVE RECEIVE BUFFER NUMBER.
(1196)            EPkLen        <= HdrBufQ{PkLen};       // SAVE PACKET LENGTH.
(1197)            end (1198)   HdrEvt0: if (EFlush) begin                      // IF SOCKET RECEIVE ERROR.
(1199)            EState        <= Idle;                 // GO FIND WORK.
(1200)            MgrCmdQ       <= {PshCd, ETcbId};      // RETURN PACKET AND FLUSH.
(1201)            end (1202)            else if (MdlVd[ETcbId]) begin          // IF APP BUFFER DSCR IS VALID.
(1203)            EState        <= FastRcv;              // GO TO NEXT STATE.
(1204)            DrmAd         <= (EBufId<<11)+PkHdrLen; // DRAM SOURCE ADDRESS.
(1205)            HstAd         <= TcbBuf{ApDsc};        // HOST DESTINATION ADDRESS.
(1206)            HstSz         <= EPkLen - HdrLen;      // DMA LENGTH.
(1207)            HstDmaCmd     <= R2hCd;                // DO RCV TO HOST DMA.
(1208)            end (1209)            else                                   // SEND FIRST FAST-PATH PACKET TO HOST.
(1210)            EState        <= InitRcv;              // SET NEXT STATE.
(1211)            DrmAd         <= EBufId<<11;           // SET DRAM SOURCE ADDRESS.
(1212)            HstAd         <= EMsgAd + MsgHdLen;    // SET HOST DESTINATION ADDRESS.
(1213)            HstSz         <= EPkLen;               // SET DMA LENGTH.
(1214)            HstDmaCmd     <= R2hCd;                // MOVE PACKET TO HOST.
(1215)            RcvBufQ       <= EBufId;               // RECYCLE RECEIVE BUFFER.
(1216)            end (1217)   FastRcv: begin                                  // NOTIFY HOST.
(1218)            EState        <= UpdMdlEntries;        //
(1219)            E2hBuf        <= FstRcvMsg;            // SEND FAST-PATH RECEIVE MESSAGE.
(1220)            HstAd         <= EMsgAd;               // SET HOST DESTINATION ADDRESS.
(1221)            HstSz         <= MsgHdLen;             // SET DMA LENGTH.
(1222)            HstDmaCmd     <= E2hCd;                // MOVE MESSAGE TO HOST.
(1223)            RcvBufQ       <= EBufId;               // RECYCLE RECEIVE BUFFER.
(1224)            TcbBuf        <= TplUpd;               // UPDATE SOCKET STATE - PARALLEL OPERATION.
(1225)            MgrCmdQ       <= {ArmCd, ETcbId};      // SEND ARM RECEIVE COMMAND TO RCV MGR.
(1226)            end (1227)   UpdMdlEntries:
(1228)            if exhausted begin                     // IF THE MDL ENTRY IS EXHAUSTED
(1229)               clear TcbBuf[TcbId]{MdlVd};         // CLEAR THE MDL VALID BIT
(1230)            end
(1231)            EState        <= FastRcv;              // GO TO THE IDLE STATE (1232)   InitRcv: begin     // NOTIFY HOST THAT FIRST FAST-PATH PACKET IS IN MESSAGE BUFFER.
(1233)            EState        <= Idle;                 // GO FIND WORK.
(1234)            E2hBuf        <= RcvReqMsg;            // FORM RECEIVE REQUEST MESSAGE.
(1235)            HstAd         <= EMsgAd;               // SET HOST DESTINATION ADDRESS.
(1236)            HstSz         <= MsgHdLen;             // SET DMA LENGTH.
(1237)            HstDmaCmd     <= E2hCd;                // MOVE MESSAGE TO HOST.
(1238)            RcvBufQ       <= EBufId;               // RECYCLE RECEIVE BUFFER.
(1239)            TcbBuf        <= TplUpd;               // UPDATE SOCKET STATE - PARALLEL OPERATION.
(1240)            end
```

SOCKET ENGINE STATES (CONTINUED)

FIG. 10E

KEY TO FIG. 10

HOST
MESSAGE
BUFFER

FIRST PHASE (FAST-PATH EVENT PURGE)
```
(1500) SktEng
(1501)   write    MgrCmdQ            { PshCd , Tcbld }              // SEND DISARM COMMAND.

(1502) RcvMgr
(1503)   read     MgrCmdQ            { PshCd , Tcbld }              // GET DISARM COMMAND.
(1504)   write    FstEvtQ            { ClrCd , Tcbld }              // SEND PURGE MARKER.
(1505)   clear    MgrBuf  [Tcbld]    { EvtEn }                      // DISARM SOCKET RECEIVE.
```

SECOND PHASE (SOCKET STATE SAVE)
```
(1506) SktEng
(1507)   read     FstEvtQ            { ClrCd , Tcbld }              // GET DISARM MARKER.
(1508)   copy     TcbBuf  [Tcbld]    { SkTpl }, HstMem[TcbAd]       // SEND STATE TO HOST.
                                                                    (ALSO SEE LINES 1123-1126).
(1509)   read     MsgBufQ            { MsgAd }                      // GET MESSAGE BUFFER.
(1510)   write    HstMem  [MsgAd]    { MsgHd }                      // NOTIFY HOST.
```

THIRD PHASE (FAST-PATH QUEUE PURGE)
```
(1510) SktEng
(1511)   write    DetCmdQ            { DblCd , Tcbld }              // SEND DISABLE COMMAND.

(1512) SktDet
(1513)   read     DetCmdQ            { DblCd , Tcbld }              // GET DISABLE COMMAND.
(1514)   clr      SktDscBuf [Tcbld]  { DetEn }                      // DISABLE SOCKET DETECTION.
(1515)   write    DetEvtQ            { DblCd , Tcbld }              // SEND PURGE MARKER.

(1516) RcvMgr
(1517)   read     DetCmdQ            { DblCd , Tcbld }              // GET PURGE MARKER.
(1518)   while    (SktRcvQRdy[Tcbld])                               // IF SOCKET RCV DESCRIPTORS.
(1519)     copy   DetEvtQ  {SlwCd ,HdrCd , PkEnd }, SlwEvtQ         // MOVE DESCRIPTOR TO SLOW QUEUE.
(1520)   write    SlwEvtQ            { DblCd , Tcbld }              // SEND PURGE MARKER.

(1521) SktEng
(1522)   read     SlwEvtQ            { DblCd , Tcbld }              // GET PURGE MARKER.
```

CONNECTION FLUSH SEQUENCE
FIG. 12

```
(1600) XmtWindow  = XmtSeqLmt  - XmtAckNum              ; // TRANSMIT WINDOW.
(1601) PktAckSz    = PktXmtAck  - XmtAckNum              ; // DATA BEING ACKED.
(1602) XmtUnAckd   = XmtSeqNum  - XmtAckNum              ; // DATA TO BE ACKED.
(1603) XmtWinAvl   = XmtSeqLmt  - XmtSeqNum              ; // AVAILABLE WINDOW.
(1604) CurCcwInc   = XmtCcwSz   + (MaxSegSz<<1)          ; // NEW CONGESTION WINDOW.
(1605) NxtUnAckd   = XmtSeqNum  - PktXmtAck              ; // DATA TO BE ACKED.
(1606) NxtXmtLmt   = PktXmtAck  + PckXmtWin              ; // TRANSMIT LIMIT.
(1607) NxtWinAvl   = NxtXmtLmt  - XmtSeqNum              ; // AVAILABLE WINDOW.
(1608) XmtAckNew   = PktXmtAck  != XmtAckNum             ; // NEW ACK DETECT.
(1609) XmtWinNew   = PktXmtWin  != XmtWindow             ; // WINDOW CHANGE.

(1610) XmtAckDup   = !XmtAckNew  &  !XmtWinNew           ; // ACK IS DUPLICATE.
(1611) XmtAckVld   = PktAckSz   <= XmtUnAckd             ; // ACK IS VALID.
(1612) XmtAckOld   = PktAckSz   >  XmtWindow             ; // OLD ACK DETECT.
(1613) CurCcwStp   = XmtCcwSz   <  NxtXmtSz              ; // CONGESTION WINDOW STOP.
(1614) CurWinStp   = XmtWinAvl  <  NxtXmtSz              ; // WINDOW STOP.
(1615) NxtSlwDet   = CurCcwInc  <  MaxXmtWin             ; // SLOW START DETECT.
(1616) NxtWinGrw   = PktXmtWin  >  MaxXmtWin             ; // XMT WINDOW IS GROWING.
(1617) NxtWinOpn   = (XmtSeqLmt - NxtXmtLmt) !< 'Quadrant ; // XMT WINDOW IS OPENING.
(1618) NxtWinShr   = (NxtXmtLmt - XmtSeqLmt) !< 'Quadrant ; // XMT WINDOW IS SHRINKING.
(1619) NxtWinStp   = NxtWinAvl  <  NxtXmtSz              ; // WINDOW STOP.
(1620) NxtXmtCcw   = !XmtAckNew ?  XmtCcwSz                // NEXT CONGESTION CTRL WIN.
(1621)              : NxtSlwDet ?  CurCcwInc  : MaxXmtWin ;
(1622) NxtCcwStp   = !XmtAckNew ?                        ; // CONGESTION WINDOW STOP.
(1623)              = ((XmtCcwSz  - NxtUnAckd) << NxtXmtSz)
(1624)              : NxtSlwDet ?
(1625)              = ((CurCcwInc - NxtUnAckd) << NxtXmtSz)
(1626)              : ((MaxXmtWin - NxtUnAckd) << NxtXmtSz) ;
(1627) XmtAckEvt   = XmtAckNew  &  (PktXmtAck == XmtSeqNum); // ACKING ALL SENT DATA.
(1628) XmtWinEvt   = !NxtWinStp &  (CurWinStp | CurCcwStp)  // TRANSMIT THRESHOLD DETECT.
(1629)              & !NxtCcwStp;
```

ITALICS = INDICATES VALUE FROM TCB BUFFER
UNDERLINE = INDICATES VALUE FROM HEADER BUFFER

INCOMING ACK PROCESSING

FIG. 13

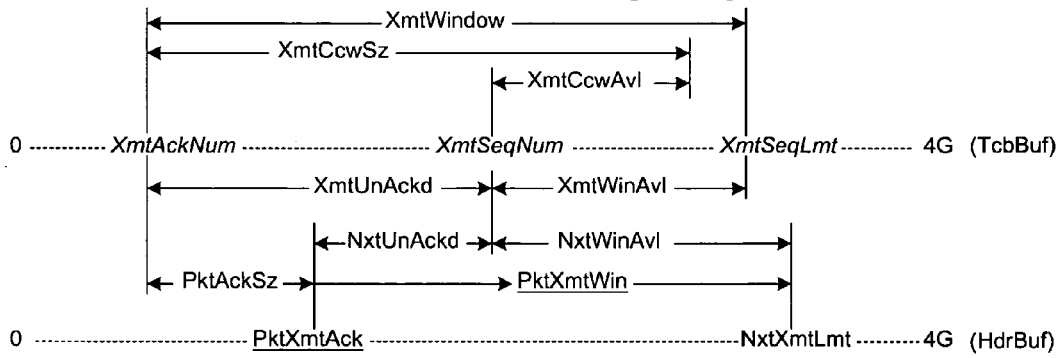

ITALICS = INDICATES VALUE FROM TCB BUFFER
UNDERLINE = INDICATES VALUE FROM HEADER BUFFER

INCOMING ACK PROCESSING

FIG. 14

(1700) CurWinFul  = (*ExpRcvSeq*  == *RcvSeqLmt*)                       ; //
(1701) HdrLenOk   = (<u>PktHdrLen</u>  == *ExpHdrLen*)                  ; //
(1702) PurAckDet  = (<u>PktPaySz</u>   == 0)                            ; //

(1703) ExpSeqDet  = (<u>PktRcvSeq</u>  == *ExpRcvSeq*);                 ; //

(1704) OldSeqDet  = ((*RcvSeqLmt*  -  <u>PktRcvSeq</u>)  !< 'Quadrant   //
(1705)            | (<u>PktRcvSeq</u> -  *ExpRcvSeq*)   !< 'Quadrant   ; //

(1706) WinPrbDet  = (CurWinFul  &  <u>PktPaySz</u>= =1)                 ; //
(1707) NxtSeqExp  = (<u>PktRcvSeq</u>  +  <u>PktPaySz</u>)              ; //

(1708) CurWinOvr  = ((*RcvSeqLmt*  -  NxtSeqExp)  !< 'Quadrant)  ; //
(1709) NewDatDet  = ((NxtSeqExp  -  *ExpRcvSeq*)  << 'Quadrant)   //
(1710)            & !OldSeqDet                                    ;
(1711) CurPktFul  = (<u>PktPaySz</u>  == *MaxSegSz*)                    ; //

(1712) FlushDet   = CurWinOvr  | (!ExpSeqDet  & !OldSeqDet)   //
(1713)            | NxtWinShr  | (!XmtAckVld  & !XmtAckOld)  ;

ITALICS = INDICATES VALUE FROM TCB BUFFER
UNDERLINE = INDICATES VALUE FROM HEADER BUFFER

INCOMING DATA PROCESSING

FIG. 15

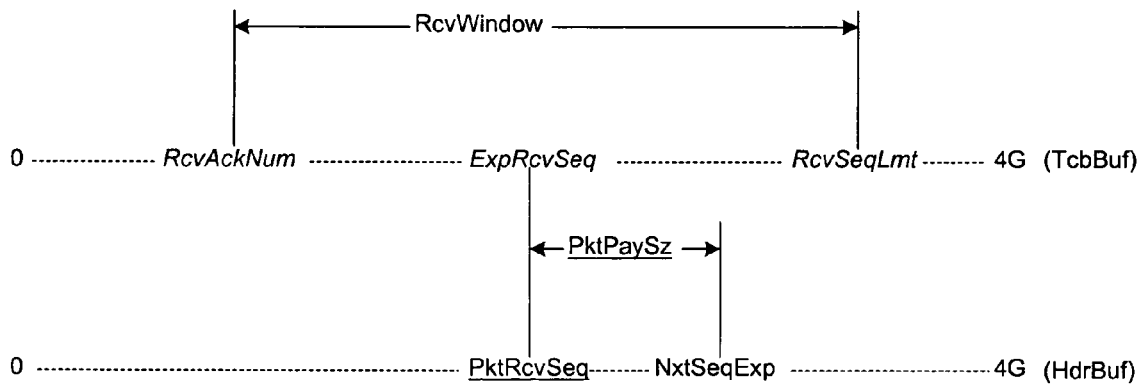

ITALICS = INDICATES VALUE FROM TCB BUFFER
UNDERLINE = INDICATES VALUE FROM HEADER BUFFER

INCOMING DATA PROCESSING

FIG. 16

| 0 | 7 | 8 | 15 | 16 | 23 | 24 | 31 |
|---|---|---|---|---|---|---|---|
| FRAME STATUS A | | FRAME STATUS A | | FRAME STATUS A | | FRAME STATUS A | |
| FRAME STATUS B | | FRAME STATUS B | | FRAME STATUS B | | FRAME STATUS B | |
| TIME STAMP | | TIME STAMP | | TIME STAMP | | TIME STAMP | |
| TIME ECHO | | TIME ECHO | | TIME ECHO | | TIME ECHO | |
| SEQUENCE | | SEQUENCE | | SEQUENCE | | SEQUENCE | |
| ACK | | ACK | | ACK | | ACK | |
| WINDOW | | WINDOW | | PAYLOAD START | | PAYLOAD START | |
| PAYLOAD LENGTH | | PAYLOAD LENGTH | | TCP CHECKSUM | | TCP CHECKSUM | |

HEADER BUFFER FORMAT

THE HEADER BUFFER IS REPRESENTED HERE AS MULTIPLE 32-BIT VALUES TO MAKE THE ILLUSTRATION MORE COMPACT FOR ILLUSTRATIVE PURPOSES. IN ACTUALITY, THE 32-BIT VALUES SET FORTH ABOVE ARE CONCATENATED END-TO-END. THE HEADER BUFFER IS ONE-BIT DEEP AND 8X32 BITS LONG.

FIG. 17

| BIT | NAME | DESCRIPTION |
| --- | --- | --- |
| 31 | 802.3Oflw | The 802.3 size/count exhausted before the end of the frame. |
| 30 | TprtFlags | The transport flags require attention. |
| 29 | TprtOpt | Transport header options were detected. |
| 28 | TprtOflw | Transport layer completed before the end of the network layer. |
| 27 | NetOpt | Network header options were detected. |
| 26 | OffsetDet | A nonzero offset value was detected for the network layer. |
| 25 | FragDet | Transport fragmentation was detected at the network layer. |
| 24 | NetOflw | Network layer completed before the end of the frame. |
| 23 | Attn | Attention Bit: Indicates that one of the following conditions occured: !MacAddrDet or IpMcst or MacMcst or !TcpIp or !TcpVer4 or 802.3Uflw or RcvEarly or BufOflw or InvalidPreamble or FcsError or DribbleNibble or CodeViolation or TprtChkErr or TprtHdrLenErr or NetHdrChkErr or NetHdrLenErr or NetUflw. |
| 22 | IpBcst | The RcvSeq detected an IP broadcast address. |
| 21 | IpMcst | The RcvSeq detected and IP multicast address. |
| 20 | PauseDet | The received control frame contained a pause command. |
| 19 | CtrlFrame | A control frame was received at the special multicast address. |
| 18 | MagicDet | A magic wake up frame was detected. |
| 17 | MacBcst | The Mac detected a broadcast destination address. |
| 16 | MacMcst | The Mac detected a multicast destination address. |
| 15 | MacBDet | Frame's destination address matched the contents of MacAddrB. |
| 14 | MacADet | Frame's destination address matched the contents of MacAddrA. |
| 13:12 | MacId | Id number of the Mac via which this packet was received. |
| 11:09 | SessType | The session layer detected by the RcvSeq.<br>0 - Session is unknown.<br>1 - Session is NFS/RPC.<br>2 - Session is FTP-Data.<br>3 - Session is WWW-HTTP.<br>4 - Session is NetBios.<br>5 - Session is reserved.<br>6 - Session is reserved.<br>7 - Session is other protocol. |
| 08:06 | TprtType | The transport layer detected by the RcvSeq.<br>0 - Transport is unknown.<br>1 - Transport is TcpIp or NlspIpx.<br>2 - Transport is UdpIp or RipIpx.<br>3 - Transport is NetBiosIpx.<br>4 - Transport is NcpIpx.<br>5 - Transport is SpxIpx.<br>6 - Transport is SapIpx.<br>7 - Transport is other. |

FRAME STATUS A

FIG. 18A

| BIT | NAME | DESCRIPTION |
|---|---|---|
| 05:04 | NetVer | The network layer version detected by the RcvSeq.<br>0 - Network version is unknown.<br>1 - Network version is other.<br>2 - Network version is 4.<br>3 - Network version is 6. |
| 03:00 | NetType | The combined network and frame layer types detected by the RcvSeq.<br>0 - Frame type is unknown.<br>1 - reserved.<br>2 - Frame is 802.3 type.<br>3 - Unused code.<br>4 - Frame is 802.3 non-snap.<br>5 - Frame is 802.3 with Snap header.<br>6 - Frame is unrecognized ethernet type.<br>7 - Frame is unrecognized 802.3-snap type.<br>8 - Frame is ethernet control type with type field = 0x8808.<br>9 - Frame is 802.3-Snap control type with type field = 0x8808.<br>A - Frame is IPX1 on ethernet type.<br>B - Frame is IPX1 on 802.3-snap type.<br>C - Frame is IPX2 on ethernet type.<br>D - Frame is IPX2 on 802.3-snap type.<br>E - Frame is IP on ethernet type.<br>F - Frame is IP on 802.3-Sanp type. |

FRAME STATUS A (CONTINUED)
FIG. 18B

KEY TO FIG. 18

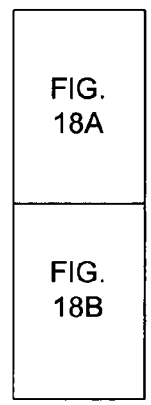

FIG. 18

| BIT | NAME | DESCRIPTION |
| --- | --- | --- |
| 31 | 802.3Uflw | The frame ended before the 802.3 size/count exhausted. |
| 30 | RcvEarly | Data was lost due to insufficient dma bandwidth. |
| 29 | BufOflw | The frame length exceeded the capacity of the current buffer. |
| 28 | PktMissed | A frame w as missed prior to receiving the current frame. |
| 27 | CarrierEvent | Refer to E110 Technical Manual. |
| 26 | GoodPacket | Refer to E110 Technical Manual. |
| 25 | LongEvent | Refer to E110 Technical Manual. |
| 24 | InvldPrmbl | Refer to E110 Technical Manual. |
| 23 | CrcErr | Refer to E110 Technical Manual. |
| 22 | DrblNbbl | Refer to E110 Technical Manual. |
| 21 | CodeErr | Refer to E110 Technical Manual. |
| 20 | TprtChkErr | A transport layer checksum error was detected. |
| 19 | TprtHdrLen | Transport header length error was detected. |
| 18 | NetChkErr | A network header checksum error was detected. |
| 17 | NetUflw | The frame ended before the Network length was satisfied. |
| 16 | NetHdrLen | Network header length error was detected. |
| 15:08 | MacHsh | The cumulative XOR of all bytes of the dest mac address of the packet received. |
| 07:00 | CtxHsh | The 8-bit context hash generated by exclusive-oring all bytes of the IP source address, IP destination address, transport source port, and the transport destination port. |

FRAME STATUS B

FIG. 19

```c
#if (C_code)
/*
******************************************************************
* The constituents of a TCB block are set forth below. The TCB block
* is shared between the ATCP driver on the host and the NID. The
* TCB block is one contiguous block (180 bytes) of fields in the host
* that gets DMA'd back and forth between host and NID. ULONG is
* four bytes, UCHAR is one byte, and USHORT is two bytes.
******************************************************************
*/
struct tcpcb /* { */

USHORT  ip_ckbase;          /* IP base checksum */
    USHORT  tcp_ckbase;         /* TCP base chksum of template hdr
                                    excluding tcp_seq, tcp_ack & tcp_win
                                    and assuming tcp_hl_flgs = ACK,
                                    and including TCP pseudo-hdr with
                                    payload of 20 (std TCP hdrlen)
                                 */

ULONG   hosttcbaddrl;       /* This TCB's address in host mem */
    ULONG   hosttcbaddrh;

/*
     * The following fields are ordered specifically to match sizes and to match
     * the order in which they are read/written.
     */

ULONG   max_rcvwnd;         /* rcv win established by host (sb_hiwat) */
    ULONG   max_sndwnd;         /* largest win peer has offered */
    USHORT  t_rttmin;           /* minimum rtt allowed */
    USHORT  pst_timer;          /* timer count for current PST */
    USHORT  t_maxseg;           /* maximum segment size */
    UCHAR   t_dupacks;          /* consecutive dup acks recd */
    UCHAR   t_shflags;          /* flags shared between BSD & NID */
    ULONG   t_rtseq;            /* sequence number being timed */
    ULONG   snd_nxt;            /* send next */
    ULONG   snd_max;            /* highest sequence number sent; used to recognize retransmits */

ULONG   rcv_adv;            /* advertised window */
    ULONG   snd_cwnd;           /* congestion-controlled win */
    USHORT  rtr_timer;          /* timer count for current RTR */
    UCHAR   t_rxtshift;         /* log(2) of persist exp. backoff */
    UCHAR   rcv_scale;          /* window scaling for recv window */
    USHORT  t_rtt;              /* round trip time (bumped per tick) */
    USHORT  t_srtt;             /* smoothed round-trip time */
    ULONG   snd_una;            /* send unacknowledged */
    ULONG   rcv_nxt;            /* receive next */
```

FIG. 20A

```
    ULONG   rcv_wnd;         /* receive window */
    ULONG   snd_wnd;         /* send window */
    USHORT  t_rttvar;        /* variance in round-trip time */
    USHORT  t_idle;          /* inactivity time (hw?)*/
    USHORT  t_rxtcur;        /* current retransmit value */
    UCHAR   t_rttupdated;    /* number of times rtt sampled */
    UCHAR   snd_scale;       /* window scaling for send window */
    ULONG   snd_wl1;         /* window update seg seq nbr */
    ULONG   snd_wl2;         /* window update seg ack nbr */
    ULONG   ts_recent_age;   /* when TS echo last updated */
    ULONG   ts_recent;       /* timestamp echo data */
    ULONG   last_ack_sent;   /* rcv_nxt of last Ack */
} tcp_stvars;                /* 100 bytes */

/*
 * Header Template
 */
struct xmit_buffer /* { */
    ULONG    reserved1;
    USHORT   byte_count;     /* byte count of frame to be xmitted */
    USHORT   reserved2;
    ULONG    reserved3;
    ULONG    link;           /* link descriptor to next frame */
    struct inic_frame_hdr /* { */
        USHORT  tmplt_len;   /* len of template hdr (incl this) */
        UCHAR   dhost[6];    /* MAC packet starts here */
        UCHAR   shost[6];
        USHORT  type;
        UCHAR   ip_vhl;
        UCHAR   ip_tos;
        USHORT  ip_len;
        USHORT  ip_id;
        USHORT  ip_fragoff;
        UCHAR   ip_ttl;
        UCHAR   ip_prcl;
        USHORT  ip_csum;
        ULONG   srcaddr;
        ULONG   dstaddr;
        USHORT  srcport;
        USHORT  dstport;
        ULONG   tcp_seq;
        ULONG   tcp_ack;
        USHORT  tcp_hl_flgs;
        USHORT  tcp_win;
        USHORT  tcp_csum;
        USHORT  tcp_urg;
        ULONG   tcp_tsopt;   /* timestamp option */
        ULONG   pad;         /* ensures space for VLAN & TS opt */
    } inic_frame_hdr;
} xmit_buffer;               /* 16 + 64 bytes */
#endif /* C_code */
```

KEY TO FIG. 20

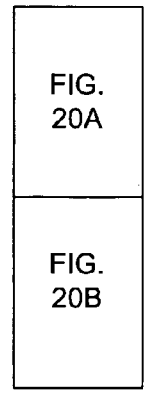

TCP/IP OFFLOAD DEVICE WITH REDUCED SEQUENTIAL PROCESSING

BACKGROUND INFORMATION

Computers communicate over the internet (and many other networks) using the TCP/IP protocol suite. Such a computer communicates by transmitting information in TCP/IP packets onto the network and by receiving information in TCP/IP packets from the network. The TCP and IP protocols are, however, fairly complex. In a simple conventional computer architecture, the central processing unit (CPU) of the computer may have to sacrifice a considerable amount of its processing power to perform the TCP/IP protocol processing necessary to allow the computer to communicate over the network. This reduces the amount of processing power available to do the other tasks that are the principal functions of the computer.

Devices called TCP Offload Engines (TOE) devices have therefore been developed. In one definition, a TOE device is a device that performs some or all of the TCP and IP protocol processing for the computer such that the processing power of the computer's CPU can be devoted to other tasks. TOE devices are often realized on expansion cards called network interface cards (NIC) cards. A NIC card that includes a type of TOE device is sometimes called an Intelligent Network Interface Card (INIC).

U.S. Pat. No. 6,247,173 describes one example of a TOE. The TOE device includes a processor as well as several other devices. The processor on the TOE executes firmware instructions that are stored on the TOE device. As networking speeds have increased, so too have the processing demands imposed on the processor of such a TOE. One way TOE processing power has been increased is by increasing the clock rate of the processor. This increases the rate at which the processor fetches and/or executes instructions. There are, however, practical limits on how high the processor clock rate can be increased. Advances in semiconductor processing technology over time have allowed ever increasing processor clock rates, but it is envisioned that the rate of increase will not be adequate to keep pace with the future demands on processing power due to even more rapid increases in network speeds.

If TOE throughput cannot be sufficiently increased simply by increasing processor clock speeds, then other techniques will have to be employed if the desired increased throughput is to be achieved. One technique for increasing throughput involves increasing the width of the processor's data bus and using a wider data bus and ALU. Although this might increase the rate at which certain TOE functions are performed, the execution of other functions will still likely be undesirably slow due to the sequential processing nature of the other TCP/IP offload tasks. Other computer architecture techniques that might be employed involve using a multi-threaded processor and/or pipelining in an attempt to increase the number of instructions executed per unit time, but again clock rates can be limiting. A special purpose processor that executes a special instruction set particularly suited to TCP/IP protocol processing can be employed to do more processing with a given executed instruction, but such a processor still requires sequential fetching of instructions. Another technique that might be employed involves using a superscalar processor that executes multiple instructions at the same time. But again, TCP/IP protocol processing tasks often involve many different functions that are done in sequential fashion. Even with a special instruction set and a superscalar processor, it still may be necessary to increase clock rates beyond possible rates in order to meet the throughput demands imposed by future network speeds. It is envisioned that supporting the next generation of high-speed networks will require pushing the clock speeds of even the most state-of-the-art processors beyond available rates. Even if employing such an advanced and expensive processor on a TOE were possible, employing such a processor would likely be unrealistically complex and economically impractical. A solution is desired.

SUMMARY

A network interface device (NID) is capable of offloading a host computer of TCP protocol processing tasks. The NID is sometimes called a TOE (TCP Offload Engine) device.

In a first aspect, the NID involves a first memory, a second memory, and combinatorial logic. The first memory stores and simultaneously outputs multiple TCP state variables. These TCP state variables may, for example, include: a receive packet sequence limit number, an expected receive packet sequence number, a transmit sequence limit number, a transmit acknowledge number, and a transmit sequence number. The second memory stores and simultaneously outputs values from the header of an incoming packet. These header values may, for example, include: a receive packet sequence number, a packet payload size number, a packet acknowledge number, and a packet transmit window number.

The combinatorial logic simultaneously receives: 1) the TCP state variables from the first memory, and 2) the header values from the second memory all simultaneously. From at least two TCP state variables and at least two header values, the combinatorial logic generates a flush detect signal. The flush detect signal is indicative of whether an exception condition (for example, an error condition) has occurred related to the TCP connection to which the TCP state variables pertain. The combinatorial logic is, for example, part of a state machine where the flush detect signal is determined from the TCP state variables and the header values in a single clock period of the clock signal that causes the state machine to transition from state to state.

In contrast to a sequential processor that would fetch instructions, decode the instructions, and then execute the instructions in order to perform multiple reads of TCP state variables from a memory and to perform multiple reads of header variables from a memory and then to use these read values and variables to determine whether the flush condition exists, the combinatorial logic of the NID is supplied with all the TCP state variables and header values necessary to make the determination at the same time. Accordingly, retrieving the TCP state variables and header values does not involve a large number of time consuming sequential memory accesses. Moreover, the state machine does not fetch instructions or execute instructions. No sequential fetching of instructions is necessary. No complex pipelining of instruction decoding is required. Still further, the determination of whether a flush condition exists is performed by high-speed combinatorial hardware logic to which the TCP state variables and header values are supplied as inputs. Rather than performing this test in software as a sequence of discrete logic tests, the combinatorial hardware logic performs the tests in parallel at hardware logic gate speeds.

In a second aspect, a NID includes a state machine that updates multiple TCP state variables in a TCB buffer all simultaneously, thereby avoiding sequential instruction execution to perform this task and avoiding sequential writing of multiple values to a memory structure. Bottlenecks associated with writing to a memory structure through a narrow data bus are avoided. The memory structure holding the TCP state variables is very wide and allows all the values to be written into the memory at the same time such that the TCP state update is performed in one or a very small number of memory write operations.

In a third aspect, a NID involves a state machine and a DMA controller. The state machine uses the DMA controller to transfer information to, and receive information from, a host computer. To set up the DMA controller to make a move of information, the source of the information is supplied to the DMA controller, the amount of information to move is supplied to the DMA controller, and the destination address where the information is to be placed is given to the DMA controller. In contrast to a sequential processor NIC card design where multiple sequential steps are required to set up a DMA transfer, the state machine of the NID in accordance with the third aspect simultaneously supplies the DMA controller with the source of the information to move, the amount of information to move, and the destination address where the information is to be placed all at the same time within one state of the state machine's operation.

The architectural aspect of storing TCP state variables and packets headers in a very wide memory structure in such a way that these variables and headers are accessed at one time in parallel and are processed by a hardware state machine, and such that the resulting updated TCP state variables are all written back to the wide memory in parallel in one or a very small number of memory writes is applicable not only to systems where control of a TCP connection is passed back and forth between a TOE device and a host, but it is also applicable to systems where a TOE remains in control of a TCP connection and where control of the TCP connection is not transferrable between the TOE and the host. By employing novel TOE architectural aspects set forth in this patent document, the number of packets processed per unit time can be increased without increasing the maximum clock speed or, alternatively, if the number of packets to be processed per unit time is to remain constant then the maximum clock speed can be reduced. Reducing clock speed for a given amount of processing throughput reduces power consumption of the overall TOE system. Moreover, the novel TOE architecture allows memory access bandwidth requirements to be relaxed for a given amount of packet processing throughput, thereby allowing less expensive memories to be used and further reducing TOE system cost.

Other embodiments and details are also described below. This summary does not purport to define the invention. The claims, and not this summary, define the invention.

BRIEF DESCRIPTION OF THE DRAWINGS

FIG. 3 is a table that sets forth the mnemonics used to refer to the various blocks of FIG. 2.

FIG. 4 is a table that sets forth how each of the blocks of FIG. 2 is organized.

FIG. 5 is a table that sets forth a brief description of each mnemonic used in the table of FIG. 4.

FIG. 6 is a table that sets forth the various variables that make up each variable in the left column of the table.

FIG. 7 sets forth in hardware description pseudocode what the various blocks of FIG. 2 do to perform slow-path receive processing of a packet.

FIG. 8 sets forth in hardware description pseudocode what the various blocks of FIG. 2 do in a connection handout sequence.

FIG. 9 sets forth in hardware description pseudocode what the various blocks of FIG. 2 do to perform fast-path receive processing of a packet.

FIG. 12 sets forth in hardware description pseudocode what the various blocks of FIG. 2 do in a connection flush sequence.

FIG. 13 sets forth in hardware description pseudocode what the combinatorial logic of the socket engine SktEng state machine does to perform incoming acknowledge (ACK) processing.

FIG. 14 is a diagram that illustrates various relationships between the various variables used in FIG. 13.

FIG. 15 sets forth in hardware description pseudocode what the combinatorial logic of the socket engine SktEng state machine does to perform incoming data processing.

FIG. 16 is a diagram that illustrates various relationships between the various variables used in FIG. 15.

FIG. 17 sets forth the format of a header buffer.

FIG. 18 sets forth the various parts of the FRAME STATUS A component of the header buffer of FIG. 17.

FIG. 19 sets forth the various parts of the FRAME STATUS B component of the header buffer of FIG. 17.

FIG. 20 sets forth the various component values that make up a TCB and that are stored in a TCB buffer.

DETAILED DESCRIPTION

Figure 1:
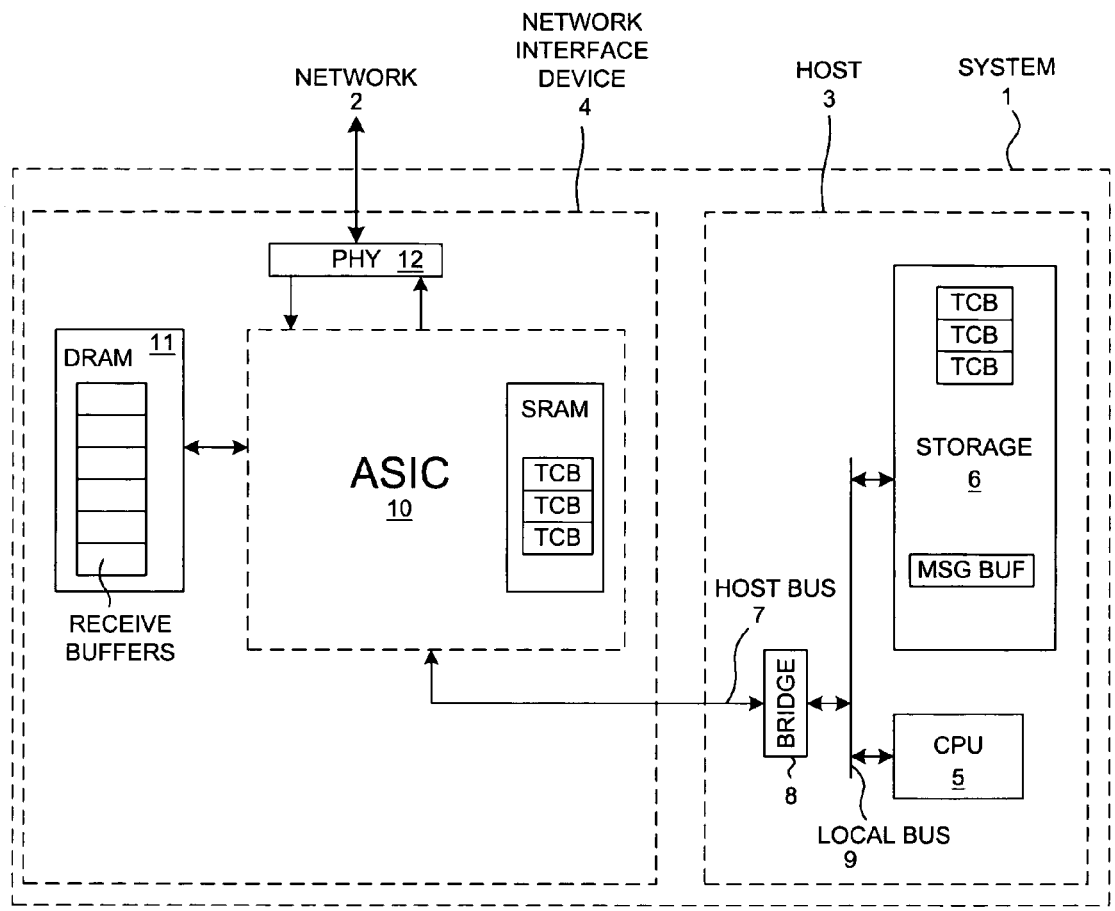
FIG. 1 (Prior Art) is a diagram of a system in which a network interface device (NID) operates in accordance with the present invention.

FIG. 1 is a simplified diagram of an exemplary system 1 used to illustrate the present invention. System 1 is coupled to a packet-switched network 2. Network 2 can, for example, be a local area network (LAN) and/or a collection of networks. Network 2 can, for example, be the Internet. Network 2 can, for example, be an IP-based SAN that runs iSCSI. Network 2 may, for example, be coupled to system 1 via media that communicates electrical signals, via fiber optic cables, and/or via a wireless communication channel.

System 1 includes a host 3 and a network interface device (NID) 4. Host 3 may, for example, be embodied on a motherboard. NID 4 may, for example, be an expansion card that couples to the motherboard. Host 3 includes a central processing unit (CPU) 5 or CPU chip-set, and an amount of storage 6. In the illustrated example, storage 6 includes a combination of semiconductor memory and magnetic disc storage. CPU 5 executes software stored in storage 6. The software includes a network protocol processing stack including a media access protocol processing layer, an IP protocol processing layer, a TCP protocol processing layer, and an application layer. The protocol layer on top of the TCP protocol processing layer is sometimes called a session layer and is sometimes called an application layer. In the description below, the layer is referred to as the application layer.

NID 4 is coupled to host 3 via host bus 7, a bridge 8, and local bus 9. Host bus 7 may, for example, be a PCI bus or another computer expansion bus. NID 4 includes an application specific integrated circuit (ASIC) 10, an amount of dynamic random access memory (DRAM) 11, and Physical Layer Interface (PHY) circuitry 12. NID 4 includes specialized protocol processing acceleration hardware for implementing "fast-path" processing wherein certain types of network communications are accelerated in comparison to "slow-path" processing wherein the remaining types of network communications are handled at least in part by the protocol processing stack executing on host 3. In the illustrated embodiment, the certain types of network communications accelerated are TCP/IP communications that meet certain fast-path criteria. NID 4 is therefore sometimes called a TCP Offload Engine (TOE).

For additional information on systems that perform fast-path and slow-path processing, see: U.S. Pat. Nos. 6,247,060; 6,226,680; 6,247,173; Published U.S. Patent Application No. 20010021949; Published U.S. Patent Application No. 20010027496; Published U.S. Patent Application No. 20010047433; and U.S. patent application No. 10/420,364 (the content of each of the above-identified patents, published patent applications and patent applications is incorporated herein by reference). System 1 of FIG. 1 employs techniques set forth in these documents for transferring control of TCP/IP connections between a host protocol processing stack and a network interface device. That information on how control of a TCP/IP connection is passed from host to network interface device and from network interface device back to the host is expressly incorporated by reference into this document as background information.

Figure 2A:
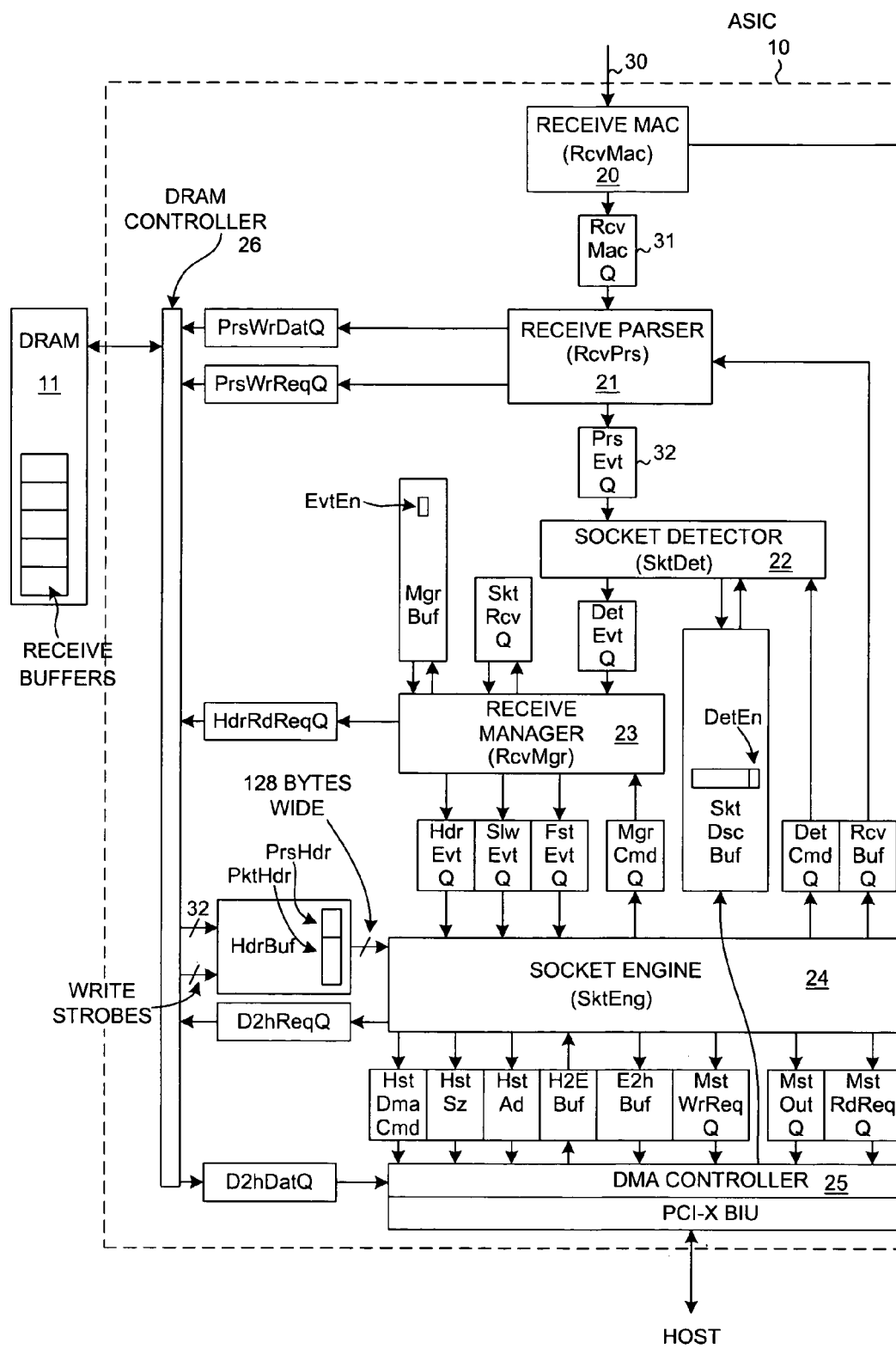
FIG. 2 is a simplified block diagram of an application specific integrated circuit (ASIC) of the NID of FIG. 1. All the read and write strobe signals and all the control signals between the various blocks that are necessary to carry out the data movements described are not illustrated in the diagram because including all those signals would obscure the information flow being explained and would result in a large diagram that would be difficult to read in a printed patent document.
Figure 2B:
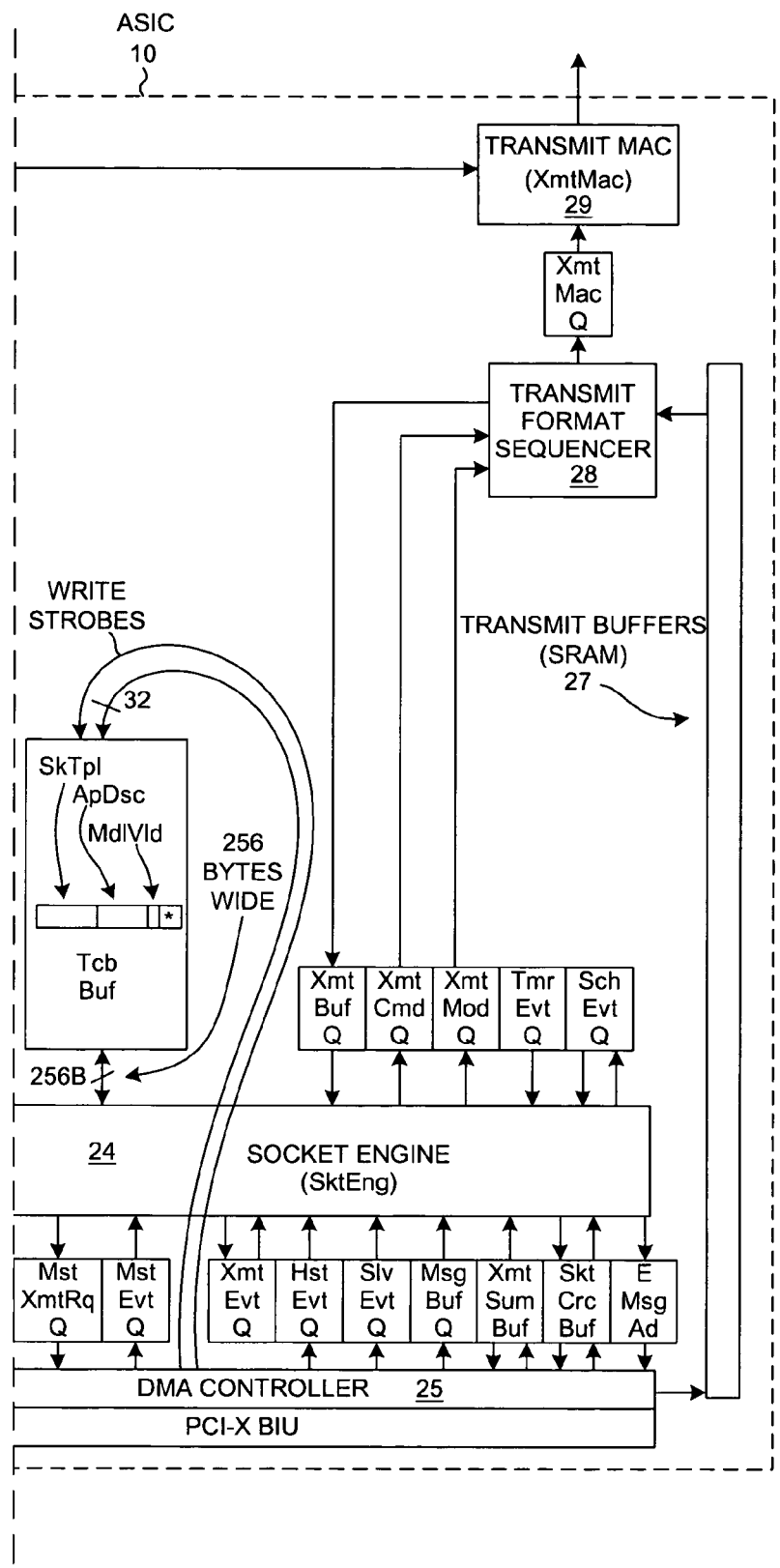

FIG. 2 is a block diagram of ASIC 10 of FIG. 1. ASIC 10 includes a receive MAC block (RcvMac) 20, a receive parser block (RcvPrs) 21, a socket detector block (SktDet) 22, a receive manager block (RcvMgr) 23, a socket engine block (SktEng) 24, a DMA controller/PCI bus interface unit block 25, a DRAM controller block 26, an SRAM block 27, a transmit format sequencer block (XmtFmtSqr) 28, and a transmit MAC block (XmtMac) 29. The remaining blocks indicate memory structures such as buffers and queues. A block labeled with a label ending in the letter "Q" indicates the block is a queue. A block labeled with a label ending in the letters "Buf" indicates the block is a buffer or a set of buffers. The queues and buffers are used to pass information between the various other blocks.

Operation of system 1 is described below by describing: 1) a slow-path receive sequence, 2) a connection handout sequence wherein control of a connection is passed from the host to the NID, 3) a fast-path receive sequence wherein TCP and IP protocol processing of packets received over the handed out connection is performed on the NID, 4) operation of the socket engine, and 5) a connection flush sequence wherein control of a connection is passed from the NID to the host. In these descriptions, mnemonics are used to refer to the various blocks of FIG. 2.

FIG. 3 is a table that sets forth the mnemonics used to refer to the various blocks of FIG. 2. Each of different types of memory blocks in FIG. 2 contains information that is formatted in a certain fashion.

FIG. 4 is a table that sets forth how each of the memory blocks of FIG. 2 is organized. The first row of FIG. 4, for example, indicates that the particular header buffer (HdrBuf) entry addressed by HdrId contains a parse header (PrsHd) followed by a packet header (PktHd). HdrBuf is a mnemonic that stands for header buffer, HdrId is a mnemonic that stands for header buffer identifier, PrsHd is a mnemonic that stands for parse header, and PktHd is a mnemonic that stands for packet header.

FIG. 5 is a table that sets forth a brief description of each mnemonic used in the table of FIG. 4. The items of information set forth in FIG. 5 are sometimes called "variables" in the description below. A variable may itself be made up of multiple other variables.

FIG. 6 is a table that sets forth the various variables that make up each variable in the left column of the table. The first row of FIG. 6, for example, indicates that a socket tuple (SkTpl) is made up of a transmit acknowledge number (XmtAckNum), a transmit sequence number (XmtSeqNum), a transmit sequence limit (XmtSeqLmt), a transmit congestions control window size (XmtCcwSz), a maximum segment size (MaxSegSz), a maximum transmit window (MaxXmtWin), a receive sequence limit (RcvSeqLmt), an expected receive sequence number (RcvSeqExp), an expected header length (ExpHdrLen), and a transmit control block address (TcbAd).

Slow-Path Packet Receive Sequence:

FIG. 7 sets forth, in hardware description pseudocode, what the various blocks of FIG. 2 do to perform slow-path processing of a packet. A line in the pseudocode is referred to by the line number that appears in parentheses to the left of the line.

Initially, a packet of network information enters ASIC 10 from PHY 12 as indicated by arrow 30 in FIG. 2. In FIG. 7, lines 701–703 indicate actions taken by the RcvMac block (RcvMac) 20. As indicated in line 701, RcvMac 20 parses the incoming packet RcvPk and looks at preambles and postambles coming off the network. RcvMac 20 checks the CRC value at the end of the packet, detects whether there was a collision after the packet started being received onto RcvMac, and performs other standard functions. RcvMac 20 generates a status word RcvSt indicating the results of this checking. The RcvMac looks at destination link addresses and based on this information filters out packets that are not destined for NID 4. In one embodiment, the RcvMac is a commercially available block of circuitry designed by a another company. If the packet is destined for NID 4, then RcvMac 20 puts a corresponding entry on the first-in-first-out RcvMacQ 31. The pushing of the entry includes the packet RcvPk as well as the status word RcvSt as indicated by lines 702 and 703.

The receive parser block (RcvPrs) 21 pops the entry off the RcvMacQ. In FIG. 7, lines 705–708 indicate actions taken by RcvPrs block 21. But before RcvPrs 21 pops the entry, it identified a location in DRAM 11 where the information will be stored. All packets passing through NID 4 are temporarily stored in DRAM 11. DRAM 11 is 2 M bytes in total and is sectioned into 1024 buffers. Each buffer is 2048 bytes in length each. Each buffer can therefore be identified by a 10-bit buffer identifier (BufId) that identifies the starting address of the buffer. To obtain the 21-bit starting address of the corresponding buffer, eleven zeros are added to the right of BufId. Storing the BufId without the eleven zeros (that would always be zeros anyway) saves memory space.

A queue called the receive buffer queue RcvBufQ (see FIG. 2) is a queue that stores BufIds of DRAM buffers that are free and available for use by RcvPrs block 21. RcvPrs block 21 pops the RcvBufQ and obtains a BufId as indicated by line 705. RcvPrs receives the BufId value, and shifts the value eleven bits to the left to obtain the starting address of the buffer in DRAM. Once RcvPrs has a place to put the packet, RcvPrs starts parsing the entry pulled off the Rcv-MacQ (line 706) and generates a parse header PrsHd.

The constituents of this parse header PrsHd are indicated in FIG. 6. For additional, more detailed information, see FIGS. 18 and 19. Frame status A and frame status B together comprise the PrsHd. Bit 23 of frame status A is the attention bit Attn. The Attn bit indicates, among other exception and error conditions, if the transport and network layer protocols of the packet are not TCP and IP.

One of the constituents of the parse header PrsHd is a header length code HdrCd. The header length code HdrCd indicates how deep the headers extend into the packet that was received. As indicated by FIG. 4, the RcvMacQ entry includes the receive packet RcvPk and receive status RcvSt. Returning to FIG. 7, RcvPrs block 21 prepends (line 707) the parse header PrsHd onto the packet RcvPk and writes this information into the receive buffer RcvBuf identified by the value BufId (BufId was popped off the RcvBufQ in line 705). RcvPrs 21 performs this write by putting the information to be written into PrsWrDatQ and then putting an instruction to DRAM controller 26 onto PrsWrReqQ. The instruction on PrsWeReqQ tells DRAM controller 26 to move data out of PrsWrDatQ and to put it into the appropriate buffer in DRAM. The request instruction indicates a number of bytes to pull off the PrsWrDatQ and also indicates a starting address in DRAM. DRAM controller 26 at some time later pops the request instruction off PrsWrReqQ that tells it how much to pop off the PrsWrDatQ and where to write the data. The designation in line 707 of "write RcvBuf [BufId] {PrsHd, RcvPk}" means write to the "receive buffer" identified by the value BufId, and to write the parse header PrsHd prepended to the RcvPk. The { } symbols enclose the information to write. The bracket symbols [ ] enclose a value that indicates which receive buffer within RcvBuf it is that will be written.

Next, in line 708, RcvPrs block 20 writes an entry onto the parse event queue PrsEvtQ 32 (see FIG. 2). The entry includes a packet end indicator PkEnd that alerts the socket detector block SktDet 22 of the arrival of the packet and the next free location (PkEnd) that can be written to in the buffer. PkEnd "Packet end" is a pointer that points to the end of the packet in DRAM (the beginning address of the buffer in DRAM, plus the size of the packet, plus the size of the parse header). From PkEnd, the socket detector SktDet extracts the original buffer ID that points beginning to the buffer and also extracts the size of the packet. The receive parser RcvPrs also includes a socket hash (SkHsh), and the socket descriptor (SktDsc) in the entry that it pushes onto PrsEvtQ. As indicated by FIG. 6, the socket descriptor SktDsc includes: a header length code (HdrCd), the IP source address (SrcAd), the IP destination address (DstAd), the TCP source port (SrcPt), and the TCP destination port (DstPt). Each socket descriptor includes a DetEn bit.

In a prior TOE device, the socket descriptor and hash were prepended onto front of the packet where the packet is stored in DRAM. To perform a TCB look up, the front part of the packet where the socket descriptor and hash were stored had to be first transferred out of DRAM to get the hash and socket descriptor necessary to perform the TCB lookup. In contrast to such a prior TOE device, the present TOE device passes the hash straight to the socket detector via the PrsEvtQ. Each PrsEvtQ entry contains PkEnd, SkHsh and SktDsc (see line 708). The packet is left in DRAM. Passing the hash and socket detector straight to the socket detector avoids having to transfer the front of the packet out of DRAM before the socket detector can perform the TCB lookup operation. Reducing the amount of DRAM accessing in this way allows the spared available DRAM access bandwidth to be used for other purposes.

Lines 710–712 in FIG. 7 indicate the operation of the socket detector block SktDet 22. SktDet block 22 pops the PrsEvtQ as indicated by line 710 and uses the retrieved hash SkHsh to see if the retrieved socket descriptor SktDsc is one of up to 4096 socket descriptors stored in a socket descriptor buffer SktDscBuf. SktDscBuf (see FIG. 2) is a dual-port memory that has 1024 buckets, where each bucket contains four socket descriptor buffers, and where each buffer can store one socket descriptor. If a TCP/IP connection is being handled in fast-path, then a socket descriptor for the connection will be stored in the SktDscBuf.

The hash SkHsh retrieved from the entry popped off the PrsEvtQ identifies one of the 1024 hash buckets. The socket detector block SktDet uses this SkHsh to identify the proper hash bucket and then checks each of the possible four socket descriptors stored in the hash bucket to see if one of those stored socket descriptors matches the socket descriptor retrieved from the PrsEvtQ.

In the presently described example, the packet is a slow-path packet. Accordingly, the "test" of line 711 results in no match. Socket detector (SktDet) then writes into DetEvtQ a slow code SlwCd, the PkEnd value, and a header length code HdrCd. The SlwCd is a two-bit value that indicates that the packet is a slow-path packet (i.e., there was no socket descriptor match). The header code HdrCd is a 2-bit code generated by the RcvPrs that indicates how deep the headers go in the particular packet. The headers extend to different depths into a packet depending on the type of packet received. The length of the header varies because the packet may or may not have certain headers like 802.3 headers, snap header, VLAN header, RDMA header, ISCSI header. HdrCd indicates how much of the packet needs to be DMA'd into the header buffer HdrBuf from DRAM 11 to make sure all the appropriate headers of the packet have been transferred. To conserve bandwidth on DRAM 11, either 64 bytes, or 128 bytes, or 192 bytes, or 256 bytes are transferred from DRAM 11 to the header buffer HdrBuf. The amount transferred is the smallest amount that still results in the headers being transferred. The socket engine SktEng block 24 only needs to look at the headers and does not have to look at the packet payload.

The operations performed by receive manager RcvMgr block 23 are set forth in lines 714 and 715 of FIG. 7. RcvMgr pulls the entry off the DetEvtQ. As indicated by FIG. 4, an entry on the DetEvtQ can have one of four formats. The entry can, for example, start with a slow code SlwCd to indicate that the associated packet is to be handled in slow-path. Alternatively, the entry can start with a fast code FstCd to indicate that the associated packet is to be handled in fast-path. A DetEvtQ entry can also start with an enable code EnbCd or a disable code DblCd.

There is a slow path event queue SlwEvtQ through which the receive manager RcvMgr communicates slow-path events to the socket engine SktEng for further processing. There is also a fast path event queue FstEvtQ through which the receive manager RcvMgr communicates fast-path events to the socket engine SktEng for further processing. Each of these queues has a ready bit. This bit indicates to the socket engine SktEng that the queue has an entry to be popped.

In the present example, the RcvMgr block 23 detects the presence of a slow code SlwCd in the DetEvtQ entry. The RcvMgr block 23 therefore merely writes the entry back out on the slow event queue SlwEvtQ. The various variables of an entry that is written onto the SlwEvtQ are set forth in FIG. 4.

The socket engine SktEng is in its idle state and detects the ready bit of the SlwEvtQ. It pops the entry off the SlwEvtQ as indicated in line 717. (Also see line 1001 of FIG. 10 that will be explained later on in the description of the socket engine states). From the slow code SlwCd in the entry popped, the socket engine SktEng knows it has to just pass the associated packet off to host 3 because in slow-path processing the host stack performs TCP and IP protocol processing.

NID 4 passes information to host 3 by a message buffer mechanism. By this mechanism, host 3 maintains a queue of message buffer identifiers in a message buffer queue MsgBufQ (see FIG. 2) on NID 3. Each of these message buffer identifiers indicates a starting address of a free message buffer in host storage 6. NID 4 can use these message buffers to pass information to the host stack.

The socket engine SktEng therefore pops MsgBufQ and obtains a message buffer address MsgAd of a free message buffer (line 718). (Also see line 1079 of FIG. 10 that will be explained later on the description of the socket engine states). The socket engine SktEng then copies (line 719) the parse header PrsHdr and the packet RcvPk from the receive buffer identified by BufId to host memory HstMem at the host memory location dictated by the message address MsgAd plus an offset MsgHdrLen. The value BufId here is extracted from the PkEnd (see line 717) because PkEnd is a concatenation of BufId and PkLen. The slow path packet is then in host memory 6 in the message buffer.

A message header is then to be sent to the host to inform the host that the message buffer contains a slow path packet. This message header is to be appended to the front of the message buffer. To do this (see line 720), the message header MsgHd is written into host memory starting at MsgAd so that the message header is prepended to the RcvPk and PrsHd in the message buffer starting at address MsgAd. (Also see line 1087 of FIG. 10 that will be explained later on the description of the socket engine states). With the packet out of DRAM 11, the DRAM buffer is freed up for storing other packets coming in off the network. This is done as indicated by line 721 by the socket engine SktEng pushing the BufId of the now free DRAM buffer onto the RcvBufQ of free buffers.

Once the packet and the message header are present in the host message buffer identified by MsgAd, the host stack examines the host message buffer (either due to an interrupt or due to host processor polling), retrieves the message header, determines that the message buffer contains a slow-path packet, and performs any necessary TCP and IP protocol processing on the packet.

Connection Handout Sequence:

NID 4 performs all or substantially all TCP and IP protocol processing on certain types of network communications, thereby offloading the host stack of this task. In the present example, a TCP connection is set up by the protocol stack executing on host 3. Once the TCP connection is set up, control of the TCP connection can be passed from host 3 to NID 4. After control of the TCP connection has passed to NID 4, NID 4 performs all TCP and IP protocol processing on subsequent packets communicated across the TCP connection provided that certain error conditions do not occur. The packet payloads of subsequent packets received over the connection are written by NID 4 directly into a final destination in application memory on host 3. The packet payloads are placed in the final destination free of any TCP or IP network headers. For control of the TCP connection to be passed from host 3 to NID 4, control of a TCB (TCP control block, sometimes called transaction control block or transmit control block) of information for that TCP connection is passed from host 3 to NID 4. The TCB includes information on the state of the TCP connection. Passing control of the TCB for the connection in this embodiment involves actually transferring a part of the TCB information from host 3 to NID 4. Control of a TCP connection is passed from host 3 to NID 4 in a two-phase "connection handout" process set forth below.

First Phase (slow-path purge): In a first phase of the connection handout process, host 3 tentatively passes control of the TCP connection to NID 4. NID 4 places a purge marker into the flow of slow-path packets received onto NID 4 for that connection, and causes NID 4 to hold subsequently received incoming packets for that connection without passing them on to host 3. Host 3 continues to process the flow of slow-path packets for that connection. When host 3 receives the purge marker, host 3 knows that the slow-path flow of packets has been purged and that it will receive no more packets for that connection. The first phase of the connection handout process is complete, and the host is then free to pass the TCP state to NID 4.

FIG. 8 sets forth a pseudocode hardware description of what the various blocks of FIG. 2 do to perform the connection handout. As indicated in line 801, host 3 builds in host memory, at location CmdAd, a receive command (i.e., a purge receive command). The purge receive command includes a command header CmdHd that indicates a purge receive command and that includes the address TcbAd on the host where the TCB of the connection is stored. As indicated by line 802, host 3 then notifies NID 4 of the purge receive command by writing a pointer (CmdAd) and an indication of the connection (TcbId) into the HstEvtQ on NID 4. The pointer CmdAd points to the receive command in host memory. The TcbId indicates which connection NID 4 is to start holding packets for.

The socket engine SktEng block 24 is in its idle state and detects the HstEvtQ being ready. The socket engine therefore pops (line 804) the host event queue HstEvtQ and retrieves the command address CmdAd and TcbId. (Also see lines 1049 thru 1052 of FIG. 10 that will be explained later on in the description of the socket engine states).

From the command address CmdAd, the socket engine SktEng causes DMA controller block 25 to retrieve the receive command (command header CmdHd and TcbAd). The socket engine SktEng looks at the command code CmdCd in the command header CmdHd and sees that this is a "Socket Descriptor Import" command (also called a "Tcb Import" command even though it results in the socket descriptor part of the TCB being imported but not the TCP state part of the TCB). See lines 1144 and 1145 of FIG. 10 that will be explained later on in the description of the socket engine states.

The socket engine SktEng uses the TcbAd to copy (line 806) the socket descriptor SktDsc from the TCB in host memory HstMem and puts the socket descriptor SktDsc into the particular socket descriptor buffer SktDscBuf on NID 4 identified by TcbId. As set forth above, there is one socket descriptor buffer on NID 4 for each Tcb that is being fast-path processed by NID 4. As indicated by FIG. 6, the socket descriptor SktDsc includes a header code HdrCd, the TCP source port, the TCP destination port, the IP source address, and the IP destination address, and a detect enable bit DetEn. (Also see lines 1153–1159 of FIG. 10 that will be explained later on in the description of the socket engine states).

Once the socket descriptor for the connection is loaded into the socket descriptor buffer SktDscBuf on NID 4, the socket engine SktEng sends (line 807) a detect enable command EnbCd to the socket detector SktDet block 22. The detect enable command EnbCd instructs the socket detector block SktDet 22 to start detecting packets for this connection. The detect enable command is sent as indicated in line 807 by the socket engine SktEng writing a socket enable code EnbCd and the TcbId into the detect command queue DetCmdQ. (Also see lines 1161–1162 of FIG. 10 that will be explained later on in the description of the socket engine states).

The socket detector SktDet block 22 pops the DetCmdQ (line 809), retrieves the socket enable code EnbCd and TcbId. The socket detector SktDet then "sets" (line 810) a detect enable bit DetEn in the particular socket descriptor buffer identified by SktDscBuf[TcbId]. This detect enable bit DetEn is a bit in the socket descriptor SktDsc that tells the socket detector that the next time it receives a packet and it compares the Tcb with the headers in the packet, it can indicate the match in the parse header PrsHd. If detect enable bit is not set, then the socket detector will not indicate a match, even if the Tcb compare with the packet headers do compare. (The detect enable bit prevents the socket detector SktDet from erroneously determining that an incoming packet should be handled in fast-path because a match to an invalid socket descriptor entry was used.)

The socket detector SktDet block 22 writes an enable code EnbCd purge marker along with the TcbId into in the detect event queue DetEvtQ (line 811).

The receive manager RcvMgr reads (line 813) the DetEvtQ and gets the EnbCd purge marker and TcbId. The RcvMgr sticks the EnbCd purge marker into the flow of packets for the connection identified by the TcbId by writing the EnbCd and TcbId into the slow event queue SlwEvtQ (line 814). Accordingly, in addition to entries that contain PkEnd values that point to buffers in DRAM where slow-path packets are stored, entries having the format of purge markers can also go onto this SlwEvtQ. For the format of such an SlwEvtQ entry containing an EnbCd purge marker, see FIG. 4.

Receive descriptors, for any packets corresponding to this Tcb, that were received before the Tcb handout was initiated, will therefore have been in the SlwEvtQ before the EnbCd purge marker, and they will be handled in normal slow-path fashion by being sent to the host stack before the purge marker is popped off the SlwEvtQ.

Receive descriptors for packets received after the purge marker, on the other hand, will be held on NID 4 by putting them in a socket receive queue SktRcvQ (see FIG. 2). The receive descriptors for such packet stack up in this SktRcvQ. The actual packets are stored as usual by the receive parser RcvPrs in DRAM receive buffers, but these DRAM receive buffers are pointed to by the PkEnd variables in the receive descriptors that are held up on the SktRcvQ.

The socket engine SktEng is in its idle state and detects an entry on the SlwEvtQ. The socket engine SktEng therefore reads (line 816) the SlwEvtQ and gets the EnbCd purge marker and TcbId. The EnbCd purge marker is a type of event code EvtCd (EvtCd==1). When the socket engine SktEng sees this particular EnbCd purge marker, the SktEng obtains a message buffer address MsgAd (that points to a message buffer MsgBuf that NID 4 can use to send a message to host 3 indicating the completion of phase one of the handout). SktEng therefore pops the MsgBufQ to obtain a MsgAd as indicated in line 817. The SktEng block 24 causes the DMA controller 25 to write a message header MsgHd into a message buffer on the host identified by the MsgAd. The message header MsgHd here indicates an enable mark message EnbMrkMsg. (Also see lines 1094–1100 of the enable mark event state of FIG. 10 that will be explained later on in the description of the socket engine states).

All messages from NID 4 to host 3 go through a virtual queue of message buffers in the host memory. As set forth above, host 3 hands out the starting addresses of free message buffers to NID 4 via the MsgBufQ. Host 3 also keeps track of the order in which the message buffer addresses were handed out to NID 4. The host stack examines the message buffers in exactly the order that the message buffers were handed out. The purge marker therefore flows through to the host stack in the form of a message header MsgHd in this virtual queue. This message header MsgHd purge marker tells the host stack that the host receive command (read by the socket engine in line 805) has been completed by NID 4.

Second Phase (load socket state): Host 3 reads (line 820) the MsgHd purge marker from NID 4 by reading HstMem at location MsgAd where NID 4 placed the message header. Upon detecting that the first phase of the connection handout has been completed, host 3 writes (line 821) the socket state in the form of the socket tuple SkTpl into a portion of host memory identified by TcbAd. As indicated by FIG. 6, the socket tuple SkTpl contains the state information of the TCB for the connection. Host 3 also writes (line 822) a socket receive command SktRcvCmd in the form of a command header CmdHd and TcbAd into the message buffer identified by CmdAd. Host 3 writes (line 823) an entry containing the address CmdAd of the command buffer and the TcbId into the host event queue HstEvtQ on NID 4.

The socket engine SktEng 24 is in the idle state and detects the HstEvtQ is ready. The socket engine therefore pops the HstEvtQ (line 825) and uses the CmdAd pointer to read (line 826) the host command (command header CmdHd and TcbAd) from the buffer in host memory. (Also see lines 1137–1141 of FIG. 10 that will be explained later in the description of the socket engine states).

The TcbAd identifies the location of the socket tuple in host memory. The command is a socket enable command. The socket engine SktEng therefore uses the TcbAd to copy (line 827) the state information SkTpl from host memory HstMem into the Tcb buffer on NID 4 identified by TcbId. (Also see lines 1177–1183 of FIG. 10 that will be explained later on in the description of the socket engine states).

Once the state has been loaded, the SktEng sends an "arm" code ArmCd (line 828) to the receive manager via the MgrCmdQ. (Also see line 187 of FIG. 10 that will be explained later in the description of the socket engine states).

The receive manager RcvMgr maintains an event enable EvtEn bit in a one-bit wide MgrBuf (see FIG. 2). There is one such event enable bit for each Tcb controlled by NID 4. If the event enable bit EvtEn for a Tcb is set, then the RcvMgr is "armed" to send one fast-path event to the socket engine SktEng for that Tcb. If there is no event for that Tcb queued on the SktRcvQ, then the receive manager RcvMgr waits until the SktRcvQ has an entry for that TcbId. When a receive descriptor is in the SktRcvQ for that TcbId as indicated by SktRcvQRdy[TcbId], then the receive manager RcvMgr pops the SktRcvQ for that TcbId and uses that entry to generate one fast-path event for the socket engine SktEng to process for that TcbId.

Accordingly, the receive manager RcvMgr pops the MgrCmdQ (line 830), and retrieves the ArmCd and TcbId. If there is a receive descriptor for this TcbId on SktRcvQ, then SktRcvQRdy[TcbId] will be true. The receive manager RcvMgr pops the SktRcvQ for that Tcb and moves the event to the fast-path event queue (line 832) by writing a FstCd and the TcbId onto the FstEvtQ.

If there is not presently a receive descriptor for this TcbId on the SktRcvQ, then SktRcvQRdy[TcbId] is false. The receive manager RcvMgr therefore sets the EvtEn bit in MgrBuf for the TcbId as indicated by line 834. The EvtEn bit is set so that the next time a receive descriptor is found on the SktRcvQ for the TcbId, the receive manager RcvMgr will pop it off the SktRcvQ for that TcbId and generate (see line 919 in FIG. 9) a fast-path event on the FstEvtQ, and then clear the EvtEn bit in MgrBuf for the TcbId.

It is therefore recognized that the EvtEn bit is used to implement a one-time arm command mechanism because when a fast-path event is returned by the receive manager RcvMgr to the socket engine SktEng, the EvtEn bit is cleared. Setting the EvtEn bit arms the receive manager RcvMgr to send one and only one fast-path event to the socket engine SktEng. This one-time arm command mechanism is provided so that the socket engine SktEng will process a packet on a fast-path connection (TcbId) only after it has completed processing the prior packet on that fast-path connection.

Upon conclusion of the actions set forth in FIG. 8, communications across the TCP connection identified by TcbId are being handled by NID 4 in fast-path. Receive descriptors for packets on the fast-path TCP connection are passed from receive manager RcvMgr to the socket engine SktEng via the fast event queue FstEvtQ for fast-path processing.

Fast-Path Packet Receive Sequence:

First Fast Path Receive Packet (the first one that sets up the final destination):

A packet of network information enters ASIC 10 from PHY 12 as indicated by arrow 30 in FIG. 2. Processing through the receive Mac block RcvMac 20 and the receive parser block RcvPrs 21 (see lines 900–908 of FIG. 9) occurs in much the same way as in the slow-path receive sequence, except that in the case of a fast-path receive sequence, the connection handout sequence described above in connection with FIG. 8 has already occurred. A socket descriptor for the TCP connection is already in the socket descriptor buffer SktDscBuf, and the socket tuple SkTpl that holds the state of the TCP connection is already in the Tcb buffer.

When the socket detector SktDet block 22 retrieves the socket hash SkHsh (line 910) and does the test SktDscBuf (line 911), a match is detected. The socket detector SktDet therefore writes a fast code FstCd into the detect event queue DetEvtQ (line 912) rather than a slow code SlwCd. As indicated by lines 912 and 913, two entries are pushed onto the DetEvtQ so that the fast code FstCd, a header code HdrCd, the packet end pointer PkEnd, and the TcbId are passed to the receive manager RcvMgr. Two entries are required because DetEvtQ is only 32-bits wide. When the receive manager RcvMgr receives a FstCd, it knows that the next entry is the TcbId so it automatically pops that second entry off the DetEvtQ as well as the first entry.

As indicated by lines 915 and 916, the receive manager RcvMgr block 23 pops the DetEvtQ twice and retrieves the entries placed there by the receive parser RcvPrs.

The receive manager RcvMgr maintains a first-in-first-out socket receive queue SktRcvQ. SktRcvQ is actually a plurality of queues, one for each TcbId. The SktRcvQ for a TcbId holds detect event descriptors for the TcbId. In the case where the receive manager RcvMgr block 23 is not armed to send a fast-path event to the socket engine SktEng and the RcvMgr receives an event from the DetEvtQ, the RcvMgr block 23 pushes the fast-path event onto the SktRcvQ for that TcbId. Accordingly, as indicated by line 917, the receive manager RcvMgr in this example writes a SlwCd to the SktRcvQ for the TcbId. The RcvMgr checks the MgrBuf for that TcbId to see if the EvtEn bit for the TcbId is set. If the EvtEn bit is set, then the RcvMgr puts a FstCd and TcbId in the FstEvtQ and clears the EvtEn bit (line 920). The EvtEn bit is cleared because it is a one-shot and one fast-path event has just been forwarded to the socket engine SktEng.

The socket engine is in its idle state when it detects the fast event queue being ready. The socket engine SktEng therefore pops (line 923) the FstEvtQ and retrieves the FstCd and TcbId. It then requests the headers for the fast-path packet by writing a ReqCd, HdrId, and TcbId onto the MgrCmdQ for the receive manager RcvMgr. (The Tcb buffer for the TcbId contains state, an MDL entry, some work area, and then areas for storing headers.) (Also see line 1117 of FIG. 10 that will be explained later in the description of the socket engine states).

The receive manager RcvMgr pops (see line 926) the MgrCmdQ and retrieves the ReqCd, HdrId and TcbId. Using the TcbId, it pops (see line 927) the SktRcvQ and gets a receive event descriptor for the current TcbId. It then uses the HdrCd and PkEnd to instruct the DRAM controller to transfer (see line 928) the parse header PrsHd and packet header PkHd from the DRAM receive buffer identified by BufId into the header buffer HdrBuf identified by the HdrId. HdrBuf is not a queue. Rather, there is one HdrBuf for each TcbId. The amount transferred out of the DRAM receive buffer by the DRAM controller is based on the HdrCd. The receive manager RcvMgr then writes (see line 929) the TcbId into the HdrEvtQ to tell the socket engine SktEng that the headers have been put in HdrBuf[TcbId].

The socket engine SktEng is again in its idle state and detects the header event queue being ready. The socket engine therefore pops the HdrEvtQ (see line 931) and retrieves the TcbId. The socket engine SktEng is thereby informed that the headers are present in HdrBuf[TcbId] and that it has a packet for the socket identified by TcbId. The socket engine SktEng now processes the packet. It does parallel processing in checking acknowledge, window and sequencer numbers as indicated in line 933. If the packet passes these tests, then the packet will be handled in fast path and the socket engine SktEng will have to know where to transfer the data in this packet.

SktEng determines where to transfer the data as follows. The first TCP payload data for a multi-packet session layer message includes the session layer header, subsequent packets do not. NID 4 passes this first TCP packet to the host stack into a virtual queue in host memory along with a message header that identifies the TcbId. The message header tells the stack that the packet is an initial receive packet for this TcbId. The host stack translates the TcbId used by NID 4 into the Tcb number used on the host. The host stack gives the session layer header of the packet to the application program operating on the host. The application program returns a memory descriptor list (MDL) indicating where to put the data payload of the session layer message. The MDL includes a list of entries, where each entry includes an address and a size. The MDL also includes a total byte count. The host passes an MDL to NID 4 by pushing an appropriate host command pointer onto the HstEvtQ. The host passes the command to NID 4 by building the command in one of its command buffers, and then putting a pointer to the command buffer on the host into the HstEvtQ of NID 4. NID 4 pops the HstEvtQ, retrieves the pointer, and DMA transfers in the command from the command buffer on the host. NID 4 now has the address and size for the first MDL entry, as well as the total byte count. When NID 4 receives payload data for a packet on the identified TcbId, NID 4 DMA transfers the data payload into host storage 6 at the address identified by the MDL entry, and decrements the size value of the MDL entry for the amount of payload data moved. As more payload data is received, the MDL entry is decremented until the size value expires. A second MDL entry is then retrieved from host memory, and the process proceeds until the second MDL entry is filled. This process continues until the total byte count for the MDL is exhausted. When the entire MDL list of entries is exhausted, the NID 4 card informs the host of this fact via the master event queue MstEvtQ and sending an interrupt to the host. NID 4 and the host then go back through the initial phase of passing an initial packet up through the host stack to the application program to get a second MDL list back.

Accordingly, in line 934, the socket engine SktEng checks to see if there is a valid descriptor entry for the TcbId. There is an MDL valid bit MdlVd in the Tcb buffer of each TcbId. The socket engine SktEng examines this MdlVd bit. If it is set, then the actions set forth in lines 935–942 are carried out, otherwise the actions set forth in lines 943–961 are carried out.

If there is a valid MDL entry, the socket engine SktEng reads (line 935) the header buffer Id BufId from the HdrBuf identified by HdrId. (The BufId is part of the parse header PrsHd.) The socket engine SktEng reads the MDL entry (called ApDsc here) that was stored in the Tcb buffer TcbBuf for this TcbId. The socket engine SktEng copies (line 937) the packet payload PayLd from the DRAM receive buffer RcvBuf[BufId] into host application memory HstMem[ApDsc]. The socket engine SktEng performs the data move by putting a request onto the DRAM-to-host request queue D2hReqQ. This request causes the DRAM controller 26 to move the payload from the DRAM receive buffer into the DRAM-to-host data queue D2hDatQ. The socket engine SktEng then gives the DMA controller/PCI bus interface unit block 25 through the MstWrReqQ a request to move the packet payload from the D2hDatQ into host memory to the location identified by the ApDsc (i.e. MDL entry).

Once the data transfer has been completed, the DMA controller/PCI bus interface unit block 25 sends a master event back to the socket sequencer on the MstEvtQ. This master event informs the socket engine SktEng that the transfer of the packet payload into host memory has been completed.

Here, for simplicity purposes, it is assumed that the transfer of data exhausted the last of the MDL entries. NID 4 therefore must notify the host stack that the MDL entries have been filled with data. (This notification involves the second host interrupt for the MDL. The first interrupt occurred on the first packet which resulted in the MDL to be returned to NID 4. This is the second interrupt after the MDL has been filled with data.)

To notify the host, NID 4 reads (line 938) the address MsgAd of a free message buffer off the message buffer Q MsgBufQ. Socket engine SktEng places an appropriate message header MsgHd into the message buffer. This message header MsgHd indicates to the host stack that data has been put in the application memory space for the TcbId. Now that data payload has been moved over to the host memory, the DRAM receive buffer on NID 4 is no longer needed and is made available for receiving another packet. The BufId of the DRAM receive buffer is therefore pushed (line 940) back onto the free buffer queue RcvBufQ.

Here in the present example, for simplicity purposes, it is assumed that the transfer of the data payload resulted in the completion of the MDL receive command and the filling of the entire MDL list made available by the host. Accordingly, there is no longer an MDL entry available to be filled for the TcbId. The MDL is therefore "invalid" and the socket engine SktEng clears the MdlVd bit in the TcbBuf[TcbId] as indicated in line 942.

If a fast-path packet is received and the MDL valid bit MdlVd is false, then the packet might be the first packet of a fast-path multi-packet session layer message. In such a situation, because MdlVd is false, processing proceeds to lines 943–961. The entire packet (header and data) will be passed to the host stack along with a fast code FstCd so that the host stack can return an MDL entry for the next fast-path packet received on the connection. Accordingly, the socket engine SktEng retrieves an address MsgAd of a free message buffer (line 944) off the message buffer queue MsgBufQ. The entire packet PayLd is then copied (line 945) from the DRAM receive buffer RcvBuf identified by BufId into the general purpose message buffer on the host identified by MsgAd. The message header MsgHd indicates that the packet payload is of a fast-path receive packet, indicates the TcbId, and indicates how much information is being transferred to the host. Once the payload PayLd has been copied from the DRAM receive buffer to the host memory, the DRAM receive buffer is recycled (see line 947) by writing the DRAM receive buffer identifier BufId back onto the free receive buffer queue RcvBufQ.

The host stack retrieves the message (line 949) from the general purpose host message buffer HstMem[MsgAd] and processes the payload of the message MsgDt (the entire packet) up through the IP protocol processing layer and the TCP protocol processing layer and delivers the session layer header to the application layer program. The application layer program returns an MDL list. The host stack moves the data portion of the session layer message of first packet into the area of host memory identified by the first MDL entry, and decrements the first MDL entry to reflect the amount of data now in the host memory MDL entry area. The host stack then supplies the first MDL entry (so decremented) to NID 4 by writing a command header CmdHd and the MDL entry (called an ApDsc) into a location in host memory (line 950). The host stack then gives NID 4 notice of the command by pushing (line 951) the starting address of the command CmdAd and the TcbId onto the host event queue HstEvtQ on NID 4.

The Socket Engine SktEng pops (line 953) the HstEvtQ and retrieves the address of the command in host memory CmdAd and the TcbId. The command header CmdHd and command data (in this case ApDsc) are then transferred (line 954) into a Tcb buffer TcbBuf[TcbId]. Because an MDL entry is now present on NID 4 to be filled, the socket engine SktEng sets (line 955) the MDL valid MdlVd bit in the TcbBuf identified for this connection (TcbId). The socket engine SktEng then sends an arm command to the receive manager by writing an arm code ArmCd along with the TcbId onto the manager command queue MgrCmdQ. This will arm the receive manager to send one fast-path event for this TcbId to the socket engine SktEng.

The receive manager RcvMgr pops the MgrCmdQ and retrieves the arm command ArmCd and the TcbId (line 958). If the socket receive queue has an entry to be popped for this TcbId (line 959), then the receive manager RcvMgr transfers (line 960) the event off the SktRcvQ for that Tcb onto the fast event queue FstEvtQ by writing a fast code FstCd and TcbId onto FstEvtQ. If, on the other hand, there is no event on the socket receive queue for this Tcb, then the receive manager RcvMgr remains armed to send a fast-path event to the socket engine SktEng when a receive event is received by the receive manager RcvMgr for this TcbId sometime in the future. The socket engine SktEng therefore returns to line 922 to monitor the fast event queue FstEvtQ to wait for a fast-path event to be passed to it from the receive manager RcvMgr.

Figures 10, 10A, 10B, 10C, 10D, 10E, 11:
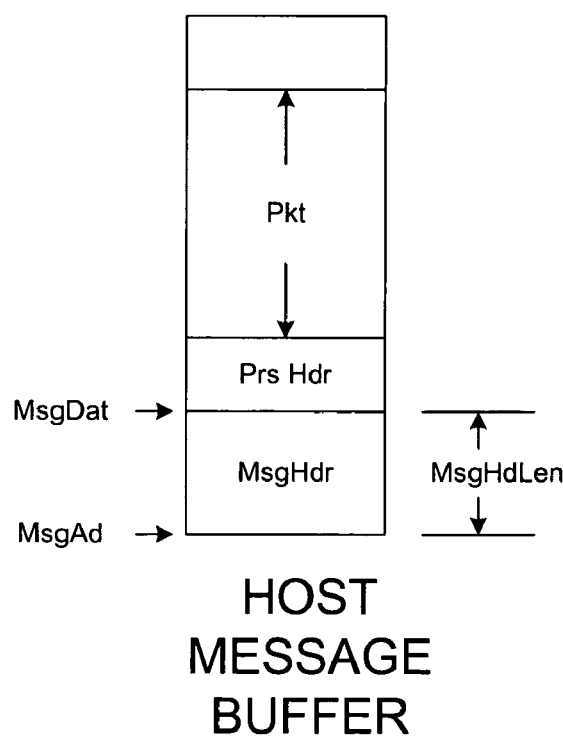
FIG. 10 sets forth in hardware description pseudocode what occurs in each of the states of the socket engine SktEng state machine of FIG. 2.
FIG. 11 is a diagram illustrating of the organization of a host message buffer.

Socket Engine States:

FIG. 10 sets forth sets forth a plurality of states through which the socket engine SktEng state machine transitions. These states are: Idle, SlwRcvEvt, SlwRcv0, EnbMrkEvt, DblMrkEvt, DblMrk0, FstRcvEvt, ClrMrkEvt, ClrMrk0, SktCmdEvt, SktCmd0; SktEnbCmd, SktEnb0, SktArmCmd, SKtArm0, SktRcvCmd, SktRcv0, HdrDmaEvt, HdrEvt0, FastRcv, UpdMdlEntries and InitRcv. The socket engine SktEng proceeds from one state to another state based on current state variables and incoming information. State transitions are only made at the time of a rising edge of a clock period of the clock signal that clocks the state machine. All actions set forth within a definition of a state below occur simultaneously within the state.

In the Idle state, the state machine is looking for something to do. If the slow event queue has a slow event entry to be popped off (i.e., SlwEvtQRdy is true), then the actions in lines 1001–1018 are carried out. If the event code EvtCd is zero, then the EvtCd is the slow code SlwCd and the actions in lines 1002–1009 are carried out. If the event code EvtCd is one, then the EvtCd is an enable code EnbCd and the actions in lines 1011–1018 are carried out. If the event code EvtCd is neither zero nor one, then the EvtCd is the disable code DblCd and the actions in lines 1020–1028 are carried out. The event code EvtCd is set by the socket detector SktDet block 22 as described above. The testing of the SlwEvtQ{EvtCd} bits as well as the "if, then, else" logic set forth in the Idle state is performed by digital logic hardware gates.

If the event code EvtCd is a zero (see line 1001), then processing of the slow-path packet is to be handed over to the host. The "E" before the designators EState, ETcbId, ECmdAd, EHdrCd, EHdrCd, EHdrAd, EBufId and EPkLen indicate local registers within the socket state machine. Engine state EState indicates the state to which the socket engine will transition next. Accordingly, EState is set to SlwRcvEvt which is the state for handling a slow-path receive event. The TcbId extracted from the entry popped off the SlwEvtQ is written into ETcbId. Similarly, the length of the header HdrCd, the receive buffer number BufId and the receive buffer length PkLen extracted from entry popped off the SlwEvtQ queue are loaded into EHdrCd, EBufId, and EPkLen, respectively. HdrCd is a code generated by the receive parser RcvPrs block 21 that indicates how big the headers are so that the socket engine can be sure to read in the parse header, the MAC header, IP header, and TCP header. In FIG. 10, the values "x" indicate don't cares. The use of "x's" allows the hardware synthesizer that synthesizes the hardware description code into logic gates to simplify the resulting hardware. All assignments within the begin-end section for EvtCd being a zero occur on one clock transition.

If EvtCd is a one (i.e., is EnbCd), then the slow event is an enable mark event (see line 1010). In the enable mark event, a purge marker EnbCd being received by the socket engine SktEng tells the socket engine SktEng that it will not receive any more descriptors for the indicated connection because the descriptors are being held in the first phase of a connection handout (Dsc import). EState is therefore loaded with EnbMrkEvt which is the state for handling an enable mark event. The other "E" values are loaded in the same fashion as in the case described above where the event code was a zero. All assignments within the begin-end section for EvtCd being a one occur on one clock transition.

If EvtCd is neither a zero nor a one (i.e., is DblCd), then the slow event is a disable mark event (see line 1019). The engine state EState is loaded with DblMrkEvt which is the state for handling a disable mark event.

If SlwEvtQRdy is not true (there is no slow event to be popped off the slow event queue) but if FstEvtQRdy is true (there is an entry to be popped off the fast event queue), then the socket engine SktEng pops the FstEvtQ and the event code EvtCd is extracted and checked (see line 1029).

If the extracted EvtCd is a zero (see line 1030), then the fast event is a fast receive event and the actions of lines 1030–1038 are carried out. EState is therefore loaded with FstRcvEvt which is the state for handling fast receive events. The "E" values are loaded as indicated.

If the extracted EvtCd is not a zero, then the fast event is a clear mark event and the actions in lines 1040–1047 are carried out. EState is therefore loaded with ClrMrkEvt which is the state for handling a clear mark event. The "E" values are loaded as indicated.

If SlwEvtQtRdy and FstEvtQRdy are both false, then HstEvtQRdy is checked (see line 1049). If HstEvtRdy is true, then an entry is popped off the HstEvtQ and the actions of lines 1050–1056 are carried out. EState is loaded with SktCmdEvt which is the state in which host commands are handled. If addition to saving the TcbId extracted from the popped entry in ETcbId, the address of the command in host memory is extracted from the popped entry and is stored in ECmdAd. This allows the DMA controller block 25 on NID 4 to go retrieve the command from host memory and load it into NID 4 for processing.

If SlwEvtQRdy, FstEvtQRdy, and HstEvtQRdy are all false, then HdrEvtQRdy is checked (see line 1058). If HdrEvtQRdy is true, then the HdrEvtQ is popped. EState is loaded with HdrDmaEvt which is the state in which entries off the HdrEvtQ are handled. The "E" values are loaded as indicated.

If SlwEvtQRdy, FstEvtQRdy, HstEvtQRdy, and HdrEvtQRdy are all false, then there is no event to service and the actions on lines 1067–1075 are carried out. EState is loaded with Idle so that the next state remains the Idle state. The socket state machine therefore will continue to check for events to handle in the idle state.

If the socket engine SktEng is in the Idle state and a SlwEvtQRdy becomes true, then the state changes by virtue of line 1002 to the slow-path receive event state SlwRcvEvt where the actions in lines 1078–1083 are carried out. The value EState is loaded with SlwRcv0 so that the next state will be the SlwRcv0 state. A free host message buffer is retrieved off the MsgBufQ and this address is loaded into EMsgAd (line 1079). This identifies a message buffer in host memory that the socket engine SktEng will use to pass the slow-path packet to the host. The EBufId is shifted left by eleven bits (line 1080) to generate the DRAM address of the corresponding 2k receive buffer that contains the slow-path packet. The receive buffer address is loaded as the DRAM address DrmAd.

FIG. 11 is a diagram illustrating a message buffer in the host. The message address MsgAd points to the beginning of the message buffer in host memory. In line 1081, the length of the message MsgHdLen is added to the message address MsgAd to get HstAd. HstAd is the address where the message data MsgDat will start in the message buffer in the host. In line 1082, the length of the slow-path packet EPkLen is loaded into HstSz. The socket engine SktEng causes the entire slow-path packet to be moved from the receive buffer in DRAM on NID 4 to the message buffer on the host by initiating a receive buffer-to-host DMA command R2hCd to the DMA controller block 25. R2h means "receive buffer to host". DMA controller block 25 uses the values HstAd and HstSz to perform the DMA operation. The writing into host memory starts at the location in the host message buffer where the message data is to start. All the operations in the begin-end section of lines 1078–1083 occur in one clock period.

Processing then proceeds to the slow-path receive zero state (SlwRcv0) in line 1085. In this state, the socket engine puts a slow-path receive message SlwRcvMsg into the engine-to-host buffer E2hBuf. This message, when received by the host, will inform the host that slow-path receive event data has been placed into one of the host's general purpose message buffers and that the host stack needs to process the incoming data. The address in the host where the message is to be placed is set (line 1088) as well and the length of the message (line 1089). The socket engine SktEng causes the message to be transferred from the E2hBuf to the host by putting an engine-to-host command E2hCd for the DMA controller 25 into the HstDmaCmd register (line 1090). When the slow-path packet has been moved from the DRAM receive buffer of NID 4 to the message buffer on the host, the receive buffer identified by BufId can be freed up for use by another receive event. EBufId is therefore pushed onto the free receive buffer queue RcvBufQ (line 1091). On the next clock, processing returns to the Idle state because EState is loaded with Idle (line 1086).

If the host has issued a command to NID 4, then a host event descriptor entry will be present in the host event queue HstEvtQ. The host event descriptor includes a pointer CmdAd that points to the host command in memory on the host. The host event descriptor also includes the TcbId to which the host command pertains. In the case of the host issuing a command to NID 4, the socket engine SktEng is in its Idle state and detects HstEvtQRdy being true (line 1049). The next state is set to the host command event state SktCmdEvt (line 1050). The socket engine SktEng pops the host event queue HstEvtQ, extracts the pointer CmdAd and the TcbId, and stores these values as indicated in lines 1051 and 1052. The SktEng proceeds to the host command event state SktCmdEvt (see lines 1137–1141).

In the host command event state SktCmdEvt (line 1137) the host command from the host event queue is read into NID 4. The next state is set to SktCmd0 state. The starting address on the host where the host command is located is set (line 1139) by loading the value ECmdAd into HstAd. A header length constant CmdHdLen that is always the same for all host commands is loaded into HstSz (line 1140) to indicate the amount of information to move. The DMA controller block 25 is instructed to do a host to NID move by loading the host DMA command HstDmaCmd with a host-to-engine command H2eCd (line 1141). The DMA controller moves the host command into the H2eBuf.

The socket engine SktEng proceeds to SktCmd0 state where the command code CmdCd of the host command is decoded. The host command just read into NID 4 can be one of three possible types: 1) a socket enable command SktEnbCmd, 2) an arm command SktArmCmd, and 3) a socket receive command SktRcvCmd. A socket enable command SktEnbCmd instructs NID 4 to start holding packets for the socket and send a purge marker back to the host. A socket arm command SktArmCmd instructs NID 4 to take the socket state from the host and load it in into NID 4 so that NID 4 can control and update the state of the socket. EState is loaded with the appropriate next state value depending on the value or the command code in the host command.

In the SktEnbCmd state (see lines 1153–1159), a socket descriptor is to be written into the socket descriptor buffer SktDscBuf to carry out the first phase of a connection handout. To do this, the ETcbId is multiplied by the length of the socket descriptors. The length of the socket descriptors in SktDscBuf is a fixed number. There are 4k descriptor buffers in the memory. The product of these two values is the starting address DscBufAd for the socket descriptor in SktDscBuf. This is the destination for the socket descriptor to be loaded.

The source of the socket descriptor is a Tcb buffer on the host. The command header from the host that was DMA'd into NID 4 is now accessed from the H2eBuf to extract from the command the TcbAd put there by the host. This TcbAd points to the beginning of the Tcb buffer on the host. This host Tcb buffer on the host has different sections, one of which contains the socket descriptor. A fixed constant SktDscIx is therefore added to TcbAd to determine the starting address on the host HstAd where the socket descriptor is located within the host Tcb buffer. SktDscIx is a fixed value determined by the format of the Tcb buffers on the host. The size of the socket descriptor SktDscLen is loaded into HstSz to set the amount of information to move from the host Tcb buffer (line 1157). A DMA move command is then issued to move the socket descriptor from the Tcb buffer on the host to the socket descriptor buffer on NID 4 by writing (line 1158) a host-to-descriptor command H2dCd onto HstDmaCmd.

In state SktEnb0 (line 160), the socket engine SktEng sends a socket enable command to the socket detector block 22 by putting an EnbCd command along with the ETcbId into the detector command queue DetCmdQ. This socket enable code EnbCd causes the socket detector to start trying to match incoming packets with the socket descriptor that was just loaded (see line 1158). When the socket detector block 22 retrieves the EnbCd command from the DetCmdQ, it sees the EnbCd code for the TcbId and pushes a purge marker for the TcbId onto the detect event queue DetEvtQ. In response to receiving the purge marker for the TcbId, the receive manager RcvMgr starts holding subsequent packets for this TcbId in its socket receive queue SktRcvQ and sends the purge marker on to the socket engine SktEng via the slow event queue SlwEvtQ. This purge marker tells the socket engine SktEng that subsequent packets received on this TcbId are being held by the receive manager RcvMgr in the socket receive queue SktRcvQ. The next state is set to the Idle state (line 1161).

Accordingly, the socket engine SktEng detects an event on the slow event queue, only this time the event code EvtCd is a one (see line 1010) indicating that the purge marker has been received by the socket engine SktEng on the slow event queue. The socket engine SktEng in turn passes the purge marker back to the host so that the host will know that the first phase of the connection handout has been completed.

Accordingly, the Tcb number is saved (line 1012) and the next state is set to the enable mark event state EnbMrkEvt (line 1011).

In the EnbMrkEvt state (lines 1093–1101), the socket engine SktEng retrieves a free message buffer address (line 1096) out of the free message buffer queue MsgBufQ. This message buffer address is loaded into HstAd (line 1098) and the amount of information to move is set (line 1099). The socket engine SktEng writes an enable mark message EnbMrkMsg into the engine-to-host buffer E2hBuf (line 1097). A DMA move of the enable mark message from the E2hBuf on NID 4 to the host message buffer on the host is initiated by loading an engine-to-host code E2hCd into HstDmaCmd. The DMA controller 25 then moves the enable mark message from E2hBuf to the message buffer on the host. The host examines the message in the host message buffer, determines that it is an enable mark message, and thereby knows that the first phase of the connection handout has been completed and that the host can now transfer the TCP state to NID 4 in the second phase of the connection handout.

Due to line 1095, the socket engine SktEng returns to the Idle state. The host sends a host command (the socket arm command) to NID 4 via the HstEvtQ to carry out the second phase of the connection handout. Accordingly, the socket engine SktEng detects HstEvtQRdy (line 1049), saves the TcbId of the host command into ETcbId, and saves the pointer CmdAd to the host command in host memory into ECmdAd. Processing proceeds via line 1050 to the host command event SktCmdEvt state. The actions of lines 1137–1142 occur. The DMA sequencer block 25 moves the host command from the host message buffer to E2hBuf. When the command code CmdCd of the host command is decoded in state SktCmd0, the command code CmdCd is a one indicating a socket arm command. In line 1147, SktArmCmd is loaded into EState and processing proceeds to the socket arm command state SktArmCmd (lines 1164–1171).

In state SktArmCmd (line 1165), the socket state on the host for the connection is to be loaded into the appropriate TcbBuf on NID 4 so that NID 4 can be "armed" to process fast-path packets for this connection. The address TcbBufAd of the Tcb Buffer in TcbBuf on NID 4 where the socket state is to be placed is determined (line 1167) by multiplying the ETcbId by the Tcb buffer length TcbBufLen. A pointer that points to the socket state of the correct Tcb on the host is determined by adding a fixed offset to the address of the Tcb buffer TcbAd on the host. This offset is a fixed offset between the start of a Tcb buffer on the host and the starting location of the socket state (socket tuple) in that buffer. The resulting pointer (which points to the socket tuple in the host Tcb buffer) is loaded into HstAd (line 1168). The size of the socket tuple SkTplLen is loaded into the HstSz (line 1169). A DMA move is then initiated to move the socket tuple from the host to NID 4 by issuing a host-to-socket tuple command H2tCd to the DMA controller 25. The command is issued by loading the host-to-socket tuple command H2tCd onto HstDmaCmd. Processing proceeds to the SktArm0 state.

In SktArm0 state (line 1172), an arm code ArmCd is sent to the receive manager RcvMgr via the MgrCmdQ (line 1174). This "arms" the receive manager to send the socket engine back one fast-path event to handle on this connection. The ArmCd is two bits, and the ETcbId is twelve bits. Entries on the manager command queue MgrCmdQ are therefore fourteen bits. The second phase of connection handout is now complete. Control of socket state has been handed off to NID 4. Once the arm code ArmCd has been passed from the socket engine to the receive manager, the receive manager can place one event descriptor for a fast-path packet on this connection into the fast event queue FstEvtQ.

The socket engine is in the Idle state. When the receive manager RcvMgr block 23 places a fast event descriptor on the FstEvtQ, then FstEvtQRdy is true. The event code EvtCd in the fast event descriptor that was popped off the fast event queue is zero (see line 1030), which means this is a fast-path receive event. The TcbId and the header buffer pointer HdrId are extracted from the fast event descriptor (lines 1032 and 1035). Socket engine processing proceeds to the next state of FstRcvEvt (lines 1114–1118).

In the fast-path receive event state FstRcvEvt (lines 1114–1118), the next state is set to Idle and the socket engine SktEng issues a command to the receive manager via MgrCmdQ (line 1117) to put the headers of the fast-path packet into the header buffer HdrBuf for this TcbId. To do this, an appropriate request command ReqCd, the TcbId and a packet identifier BufId are loaded into the manager command queue MgrCmdQ. BufId describes where the packet is in DRAM. The receive manager RcvMgr uses the ETcbId to identify the correct socket receive queue in SktRcvQ, pulls the next event descriptor for the indicated connection off that queue, and uses the event descriptor to cause a DMA move of the packet headers from the DRAM receive buffer (identified by BufId) into the header buffer HdrBuf for this TcbId. The headers that are thereby placed in the header buffer are the parse header, link header, TCP and IP headers. To alert the socket engine SktEng that the headers are now in the header buffer, the receive manager RcvMgr puts a header event entry in the header event queue HdrEvtQ. This entry indicates the TcbId.

Socket engine is back on Idle state. Due to the actions of the receive manager RcvMgr, a header event is on the header event queue and HdrEvtQRdy is true. The socket engine therefore carries out the actions of lines 1058–1066. The TcbId is extracted from the header event queue HdrEvtQ entry (line 1060), and the next state is set to HdrDmaEvt state (line 1059).

In the HdrDmaEvt state (lines 1190–1197), the next state is set to HdrEvt0. The packet length is extracted out of the parse header in the header buffer HdrBuf (line 1196) and is saved in EPkLen. The receive buffer in DRAM where the packet payload data is stored is also stored in EBufId (line 1195). A flush detect operation FlushDet is also performed to process the current state of the receive and transmit windows with the information coming in on the fast-path receive packet.

As described above, on slow-path the receive packet with a parse header and message header are placed into a message buffer and are passed through the message buffer mechanism to the host. On fast-path, all TCP and IP protocol processing is done on NID 4 and only the payload data is placed into the MDL space on the host. The host nevertheless has to be informed by NID 4 that the payload data was delivered to the MDL. This notification is sent to the host via the same message buffer mechanism. Accordingly, the socket engine SktEng retrieves a free message buffer address from the free message buffer queue MsgBufQ and this message buffer address is saved (line 1193).

Processing proceeds to the header event zero state HdrEvt0 (lines 1198–1216). In HdrEvt0 state, if a flush was detected (EFlush is true), then one set of actions (lines 1199–1200) is performed. If there is no flush detected, and if there is an MDL entry for the Tcb to be filled, then the actions of lines 1202–1208 are carried out. If there is no flush detected and there is also no MDL entry in the Tcb to be filled, then the actions of lines 1209–1216 are carried out. A situation where there is no flush condition detected but there is no MDL entry valid is on the receiving of the first packet of a fast-path multi-packet message. In such a case, NID 4 does not know where in host memory to put the packet payload and consequently the MdlVd bit in the Tcb will be false.

In the presently described example, the fast-path packet received is the first packet of a multi-packet message and there is no MDL entry for the fast-path connection yet in the TcbBuf. The actions of lines 1209–1216 are therefore carried out.

The next state is set to InitRcv state (line 1210) and the first fast-path packet is sent to the host in a general purpose message buffer. To move the packet, the address of the DRAM receive buffer is determined by shifting EBufId eleven places (line 1211). The packet length EPktLen is loaded into HstSz. The packet payload data is to be transferred to an address on the host that is the sum of the host address EMsgAd and the message header length MsgHdLen. This puts the packet data payload at the end of the message header. The DMA move is kicked off by putting a receive buffer-to-host command R2hCd onto HstDmaCmd. This causes the packet to be given to the host like a slow-path packet via a host message buffer, but a different type of message header (a receive request message header) is used in the case of this initial fast-path packet. The message header tells the host stack to get an MDL list from the application indicating where to place additional data payloads for subsequent fast-path packets received on this connection.

Accordingly, the next state is the initial receive state InitRcv (line 1232) where the receive request message is sent to the host. The receive request message contains the initial fast-path packet.

The host gets the receive request message out of its message buffer, and processes the data portion of the packet (which is the initial fast-path packet), and supplies the initial fast-path packet to the application program. All protocol processing below and including the TCP protocol layer is performed by NID 4. The application program returns an MDL list for this connection. The host stack writes the MDL list into the Tcb host buffer for the proper Tcb. The MDL and MDL list are not, at this point, communicated to NID 4. To communicate an MDL entry to NID 4, the host forms a host command in host memory. The host then pushes a pointer CmdAd to where the host command is in host memory onto the HstEvtQ.

The socket engine then goes back to the Idle state, but now there is a host event ready HstEvtRdy for the socket engine. The actions of lines 1050–1057 are carried out. The socket engine pops the entry off the HstEvtQ, and extracts the command pointer CmdAd and the TcbId from the entry. The next state is set to SktCmdEvt.

In SktCmdEvt (lines 1136–1142), the socket engine causes the DMA controller block 25 to move the host command from the host and into the H2eBuf (see line 1141). In the SktCmd0 state, the host command in the H2eBuf is examined and the command code CmdCd is decoded. Here the command is neither a SktEnbCmd nor a SktArmCmd. SktEng processing (see line 1150) therefore proceeds to the socket receive command state SktRcvCmd.

In SktRcvCmd state (lines 1176–1183), the first MDL entry (called ApDsc) of the MDL list is loaded from the Tcb buffer on the host into the appropriate field of the TcbBuf for the TcbId on NID 4. The source address where the MDL entry is located on the host is set (line 1180) by adding an application descriptor offset ApDscIx to the starting address of the Tcb buffer in the host. The amount of information to move from the Tcb buffer on the host is set (line 1181) to the constant ApDscLen. The destination for the move of the MDL entry is set (line 1179). The starting address of the Tcb buffer on NID 4 is the TcbId number multiplied by the length of a Tcb buffer TcbBuflen. An offset ApDscIx to the MDL entry within a Tcb buffer is then added to the starting address to determine the destination address TcbBufAd where the MDL entry will be written. The socket engine SktEng then causes the DMA controller 25 to move the MDL entry from host memory to the TcbBuf on NID 4 by placing a host-to-socket tuple command H2tCd onto HstDmaCmd.

Next, in state SktRcv0, the receive window TcbBuf{RSqMx} is incremented (line 1186). The host, when data was consumed by the application, the application changes the window size by moving the receive sequence. The host tells us how much we can change the window by. We go to the TcbBuf and pull out the receive sequence max value RSqMx, add the amount indicated by the host in the command h2eBuf{SqInc}, and put the updated value back into the Tcb buffer TcbBuf as the new receive sequence maximum TcbBuf{RSqMx}. (RSqMx is sometimes denoted RcvSqLmt). There is hardware related to transmitting frames, and that hardware transmits some of this window information to the guy who is sending data to us to tell him how much more data he can send us, we do that by telling the sender the window size, and the window size is partially derived from this receive sequence limit, so when the sender sees this information coming in he knows how much more data we can accept. So we update the receive sequence limit and go back to the Idle state.

Because an MDL entry is now present in the TcbBuf on NID 4, the MDL valid bit within the Tcb buffer is set (line 1188). The next time there is a fast receive event, the MDL valid bit in the Tcb buffer will be set so processing will not pass through the initial receive sequence to retrieve an MDL entry from the host, bur rather processing will go through the fast receive sequence because there is a valid MDL.

The socket engine SktEng returns to the Idle state. Due to the receive manager RcvMgr being armed, a receive event descriptor for the second fast-path packet on the connection can be forwarded from the receive manager RcvMgr to the socket engine SktEng via the fast event queue FstEvtQ. The socket engine sees FstEvtQRdy being true and the event code EvtCd being zero, and passes through the process set forth above of extracting the TcbId and going to the FstRcvEvt state (lines 1115–1118). In the fast-path receive event state FstRcvEvt, the socket engine instructs the receive manager via MgrCmdQ to deliver headers for the second fast-path packet identified by TcbId (line 1117) and then go back to the Idle state. The headers go through the header buffer HdrBuf to the socket engine, and the receive manager RcvMgr puts a header event for that Tcb on the HdrEvtQ.

The socket engine SktEng is in the Idle state, detects HdrEvtQRdy, and performs the actions of lines 1058–1066. The TcbId from the header event queue is saved (line 1060) into ETcbId. ETcbId is a register that is local to the socket engine. Loading a TcbId into ETcbId makes all the bits of the particular Tcb buffer in TcbBuf that is identified by the TcbId available to the socket engine. All the bits of the identified Tcb buffer are available at once.

The header buffer pointer HdrId is saved (line 1063) into EHdrAd. EHdrAd is a register that is local to the socket engine. Loading a header buffer pointer into EHdrAd makes all the bits of the particular header buffer HdrBuf that is identified by the HdrAd available to the socket engine. All of the bits of the identified header buffer are available at once.

Next, in the HdrDmaEvt state (lines 1191–1197), the bits of the header (as output by the header buffer identified by EHdrAd) and the bits of the Tcb (as output by the Tcb buffer identified by ETcbId) are used to perform the flush detect FlushDet test (line 1194). Assuming that there is not flush event, the socket engine transitions to HdrEvt0. This time MdlVd[ETcbId] is true (as opposed to the initial receive pass through this state) so NID 4 knows where to place the data payload in the host. The buffer Id is shifted eleven places to find where the packet starts in the DRAM receive buffer, and skip over the packet header to actual data (line 1204). This address, DrmAd, is the source of the data payload that will be moved to the host. For the destination address on the host, HstAd, the application descriptor ApDsc (i.e., MDL entry) stored in the TcbBuf on NID 4 is used (line 1205). The amount of payload data to move is the packet length EPkLen minus the amount of header HdrLen. A move of the packet payload from the DRAM receive buffer on NID 4 to the address on the host identified by the MDL entry is initiated by pushing a receive buffer-to-host command R2hCd onto HstDmaCmd. DMA sequencer block 25 performs the move.

Once the data payload has been copied to the host, the socket engine proceeds to the fast receive state FastRcv (lines 1217–1225). In this example, the move of payload data to the MDL entry exhausted the MDL entry. A fast receive message is therefore prepared and sent to the host stack to inform the host stack that that particular MDL entry is exhausted and that the host's receive command has been completed. (Although not shown here, in a state (not shown), the byte count of the MDL entry is decremented according to how much data payload was moved to see if the MDL entry is exhausted, and if it is exhausted then processing proceeds through the FastRcv state, otherwise the updated MDL value is loaded back into the TcbBuf and the socket engine returns to the Idle state to look for another fast-path receive event). The fast receive message FstRcvMsg is passed using the same host message buffer technique described above. The socket engine causes the DMA sequencer 25 to move the message from NID 4 to the message buffer on the host by putting a E2hCd command onto HstDmaCmd (line 1222). The connection state in the socket stored in the TcbBuf is updated TplUpd (line 1224). The tuple update TplUpd values are set forth in FIG. 6. TplUpd in line 1224 indicates that Tcb buffer values are updated as set forth below:

TcbBuf[TcbId]{ExpRcvSeq}<=TplUpd{NxtSeqExp}
TcbBuf[TcbId]{XmtAckNum}<=TplUpd{PktXmtAck}
TcbBuf[TcbId]{XmtSeqLmt}<=TplUpd{NxtXmtLmt}
TcbBuf[TcbId]{XmtCcwSz}<=TplUpd{NxtXmtCcw}

Because processing of this second fast-path packet by the socket engine is now completed, the socket engine "arms" the receive manager RcvMgr to send another event descriptor for this connection (line 1225).

Processing proceeds to state update MDL entries UpdMdlEntries. If the MDL entry provided by the host has been exhausted, then the MDL valid bit in the Tcb buffer on NID 4 is cleared (line 1229). The next state is set to FastRcv (line 1231).

Connection Flush Sequence:

FIG. 12 is a diagram that sets forth actions taken by the various blocks of hardware of FIG. 2 when passing control of a connection from NID 4 to host 3 after a flush condition is detected on the connection. In a fast-path receive situation, the socket engine SktEng enters the fast-path receive event state FstRcvEvt (see lines 1114–1118 of FIG. 10). The socket engine SktEng sets the next state to Idle (line 1116) and tells the receive manager. RcvMgr to deliver a header to the socket engine (line 1117). Accordingly, the socket engine SktEng is in the Idle state and header event HdrEvtQRdy becomes true (see line 1058). Due to line 1059, the socket engine SktEng passes to the header DMA event HdrDmaEvt state (see line 1191–1197) and then to the HdrEvt0 state (see lines 1198–1216). There the flush detect condition is detected (see line 1194) and the one-bit value FlushDet is loaded into EFlush. If EFlush is true (see line 1198), then in HdrEvt0 state the socket engine SktEng pushes a "push" code PshCd (see line 1200) onto the receive manager's command queue MgrCmdQ.

Returning to FIG. 12, the receive manager RcvMgr pops the MgrCmdQ (line 1503) and retrieves the push code PshCd and the TcbId. This push code causes the receive manager RcvMgr to reverse the effect of the popping of the last descriptor off the SktRcvQ. The push code PshCd causes RcvMgr "push" the read point for the socket receive queue SktRcvQ back one descriptor entry. The socket receive queue SktRcvQ for the TcbId has a read pointer and a write pointer. When a descriptor is popped off the socket receive queue SktRcvQ, the descriptor is not actually erased from the memory but rather the descriptor is left in the queue memory and the read pointer is advanced so that the next time the SktRcvQ is popped the next entry on the queue will be read. In the case of the receive manager RcvMgr receiving the push code PshCd, however, the read pointer is backed up one descriptor entry and is not advanced. Because the receive descriptor previously popped still remains in the queue memory, pushing back the read pointer puts the SktRcvQ back in the original condition as if the last popped descriptor had never been popped off the queue.

The receive manager RcvMgr also inserts a purge marker ClrCd into the flow of fast-path receive descriptors for the TcbId by writing the ClrCd and TcbId onto the fast-path event queue FstEvtQ (line 1504). Later, when the socket engine processes receive descriptors for this TcbId off the fast-path event queue, the socket engine will detect the ClrCd. Encountering the ClrCd informs the socket engine that there will be no more fast-path events for the TcbId due to an encountered error. Fast-path packet receive descriptors in the fast-path event queue FstEvtQ prior to the purge marker ClrCd will, however, be handled in fast-path. Handling fast path packets in fast path mode before the packet that caused FlushDet to be true reduces latency in handling the flush condition.

The receive manager RcvMgr also clears the event enable bit EvtEn in MgrBuf (line 1505) to prevent any more fast-path receive descriptors from being sent by the receive manager RcvMgr to the socket engine for this TcbId. This concludes the first phase (fast-path event purge phase) of the connection flush operation.

The socket engine SktEng is in state Idle state when FstEvtQRdy is detected to be true (see line 1029). The SktEng reads the fast-path event queue FstEvtQ (line 1507) and retrieves the event code EvtCd. The event code EvtCd is the purge marker ClrCd (also called the "clear mark event" code). The event code being a clear mark event informs that socket engine SktEng that the fast-path event receive queue FstEvtQ is clear of fast-path receive event descriptors for this particular connection identified by TcbId. The TcbId is extracted from the entry popped off the fast-path event receive queue FstEvtQ (see line 1041). The EvtCd being the clear mark event causes the socket engine SktEng to transition to state ClrMrkEvt (lines 1120–1128).

In state ClrMrkEvt, the socket engine SktEng puts a disable code DblCd and the ETcbId in the detect command queue DetCmdQ (see line 1127) for the socket detector SktDet. The socket engine SktEng obtains a message buffer address out of the message buffer queue MsgBufQ (line 1122) for future use in the ClrMrk0 state. The socket engine SktEng sets up a move of the current socket state SkTpl of the connection (also see line 1508) from the Tcb buffer TcbBuf[TcbId] to the Tcb buffer HstMem[TcbAd] in host memory. It does this by putting a tuple-to-host command T2hCd onto HstDmaCmd. The DMA controller 25 receives the T2hCd and moves the socket tuple information to the indicated host message buffer. See lines 1120–1126 of FIG. 10 for further details.

The socket engine SktEng transitions to state ClrMrk0 and informs the host that the socket tuple SkTpl that carries the TCP state information has been placed back in the host Tcb buffer for this connection. The socket engine does this by retrieving a free message buffer address (line 1509) from the MsgBufQ, and then writing a state export message ExportMsg into the engine-to-host buffer E2hBuf (line 1131). The destination for a DMA operation is set to the be the message buffer address EMsgAd. The length of the DMA move is set to be the length of the message header MsgHdLen (line 1133). The socket engine SktEng then causes the DMA to occur by placing an engine-to-host command into HstDmaCmd (line 1134). The DMA controller 25 then moves the state export message from NID 4 to the message buffer on the host. This concludes the second phase (socket state save) of the connection flush operation.

In the third phase (fast-path queue purge) of the connection flush operation, the socket engine SktEng tells the socket detector SktDet to stop detecting packets for this TcbId because the future packets are to be handed off to the host for TCP processing on the host. In state ClrMrkEvt, the socket engine SktEng writes a disable command DblCd and the ETcbId onto the socket detector command queue DetCmdQ (line 1511 of FIG. 12). Also see line 1127 of FIG. 10.

The socket detector SktDet 22 detects packets on this connection until it sees the disable command DblCd on the detector command queue DetCmdQ. The disable command DblCd instructs the socket detector to stop detecting packets. The socket detector SktDet (line 1513) reads the DetCmdQ and obtains the disable command DblCd and the indicated TcbId. The socket detector SktDet then clears the detect enable bit DetEn in the socket descriptor buffer SktDscBuf for the TcbId (line 1514), and sends a purge marker DblCd to the receive manager RcvMgr by writing the purge marker DblCd onto the detect event queue DetEvtQ (line 1515). This guarantees that anything in the detect event queue DetEvtQ for that Tcb in the DetEvtQ after the DblCd purge marker is not going to be fast-path, and will be slow-path because the socket detector has been disable for the indicated TcbId. The DblCd purge marker flows through the DetEvtQ to the receive manager RcvMgr. The receive manager RcvMgr receives the purge marker DblCd and the TcbId (line 1517), and takes all the descriptors for that TcbId off the SktRcvQ and puts them onto the slow event queue SlwEvtQ (see lines 1518–1519). When done, the receive manager RcvMgr puts a purge marker DblCd onto the slow event queue SlwEvtQ (line 1520).

Meanwhile the socket engine SktEng is pulling slow-path events off the SlwEvtQ until it is in the Idle state and reads slow event queue SlwEvtQ and obtains the purge marker DblCd (line 1522). Also see line 1020 of FIG. 10. When the socket engine SktEng obtains the purge marker DblCd, the socket engine SktEng goes to DblMrkEvt state (lines 1103–1106 of FIG. 10). A purge message is sent to the host to tell the host that the socket detector has been disabled for the indicated TcbId. The socket engine SktEng does this by obtaining a message buffer address from the host (line 1105), placing a disable-mark message into the engine-to-host buffer (line 1109), and then causing the DMA controller 25 to move the message from NID 4 to the host by placing an engine-to-host command E2hCd into HstDmaCmd (line 1112). When the host sees the disable-mark message in its message buffer, the host knows that the indicated socket descriptor is no longer in use, that the socket receive queue SktRcvQ for the indicated TcbId is empty, and that the host can put a different socket descriptor out to the socket detector SktDet to enable fast-path processing on another socket.

Flush Detect:

In the processes above, the detection of a flush condition as indicated by the one-bit FlushDet value (see line 1194) occurs in one clock cycle of the clock signal that clocks the socket engine SktEng state machine. FIGS. 13–16 set forth how flush detect FlushDet is determined. In FIGS. 13–16, the italicized values are values from the particular Tcb buffer TcbBuf identified by TcbId; whereas the underlined values are values from the header of the incoming packet as output by the header buffer HdrBuf identified by HdrId. Both types of values (TcbBuf values and HdrBuf values) are received onto the socket engine SktEng. The values that are neither italicized nor underlined are values that are determined inside the socket engine SktEng from another value.

The FlushDet signal is determined as indicated by lines 1712–1713 of FIG. 15. The FlushDet signal is true if the current window overflow CurWinOvr OR ((NOT expected sequence detected !ExpSeqDet) AND (NOT old sequence detected OldSeqDet) OR (next window shrink NxtWinShr) OR ((NOT transmit ack valid XmtAckVld) AND (NOT transmit ack old XmtAckOld). The vertical bar symbol indicates a logical OR. The exclamation mark symbol indicates a logical NOT. The & symbol indicates a logical AND. The quote symbol indicates a defined constant. The "==" symbols indicate "if equal to". An equation of the form A?B:C indicates "if A, then B, else C". The != symbols indicate "not equal to". The !<symbols indicate "not less than". The !=symbols indicate "not greater than". The <= symbols indicate an assignment of the expression to the right to the value to the left. The << symbols indicate shift to the left, and the number of times to shift is indicated by the value to the right of the << symbols.

For example, the current window overflow value CurWinOvr is a single bit value determined as indicated by line 1708 from RcvSeqLmt, NxtSeqExp, and Quadrant. If RcvSeqLmt minus NxtSeqExp is not less than the constant Quadrant, then there is a current window overrun and CurWinOvr is set to one. RcvSeqLmt is a 32-bit value obtained from the Tcb Buf. See FIGS. 4 and 6 for the contents of the Tcb buffer. NxtSeqExp is a 32-bit value that is calculated by taking the 32-bit value PktRcvSeq and adding that to the 16-bit value PktPaySz. PktRcvSeq is a value stored in the header buffer. The value PktPaySz is a value obtained from the header buffer values PktRcvSeq and NxtSeqExp. Quadrant is a 32-bit value 40000000 in hex.

In the same way that the current window overrun value CurWinOvr is calculated in accordance with the equations of FIGS. 13–16, so too are all the other values that appear to the right of the equals sign symbol in the equation of lines 1712 and 1713.

The (!ExpSeqSet & !OldSeqDet) expression of line 1712 is true if the 32-bit sequence number of the packet is a future sequence number. An old packet such as, for example, a duplicate packet will have a sequence number that is smaller (i.e., older) than the expected sequence number. Such an old packet does not cause a flush detect because the old packet may be a duplicate packet and such a duplicate packet is to be passed to the host without the NID causing a flush of the connection. In such a case, the host can cause control of the connection to be passed back to the host it the host so chooses. Accordingly, if a packet is received that has a sequence number that is smaller (i.e., older) than the expected sequence number, then the FlushDet signal is not true. If the sequence number of packet is the expected sequence number, then the packet has the sequence number it should and there is no flush detected. If, on the other hand, the received packet has a sequence number that is greater than the expected sequence number, then the packet is a future packet that was received before it should have been received and there has likely been an error. Accordingly, flush detect is true (see line 1712) if the sequence number of the packet was not the expected sequence number and if the sequence number was not an old sequence number.

The expected sequence number detected value ExpSeqDet used in the expression of line 1712 is calculated as indicated by line 1703. The expected sequence number detected ExpSeqDet is true if the sequence number of the packet PktRcvSeq as stored in the header buffer is equal to the expected receive sequence ExpRcvSeq number stored in the Tcb buffer. ExpRcvSeq is the sequence number of the next packet that should be received on the connection. When a packet is received, ExpRcvSeq is increased by the amount of data payload in the previous packet received. Accordingly, to get the next ExpRcvSeq, the payload size PktPaySz of the current packet is added to the packet's sequence number PktRcvSeq, and that sum is the next sequence number expected NxtSeqExp. The unit of the packet payload PktPaySz is number of bytes of data. After the packet is processed, NxtSeqExp becomes the expected sequence number ExpRcvSeq stored in the Tcb buffer.

The NxtWinShr expression of line 1713 is true if a machine receiving data from the NID 4 has shrunk its TCP receive window. Shrinking a TCP receive window is discouraged in the TCP protocol. The machine receiving the data from NID 4 returns an acknowledgement PktXmtAck of the data it received in the next packet it sends back to NID 4. The machine receiving the data also include a window size PktXmtWin in the return packet. NID 4 receives the return packet uses the two values to determine (line 1618) whether the other machine has shrunk its receive window. A shrinking TCP receive window is detected by determining if the current transmit limit XmtSeqLmt is greater than the next transmit limit NxtXmtLmt.

The current transmit sequence limit XmtSeqLmt is a sequence number value stored in the socket tuple on NID 4. NID 4 uses XmtSeqLmt sequence number value to determine how much data it can transmit back to the other machine. The other machine controls this value but is not allowed to reduce it.

The next transmit limit NxtXmtLmt is determined (see line 1606) by NID 4 by adding the PktXmtAck to the window size PktXmtWin.

If the NxtXmtLmt that the NID is allowed to transmit to is less than the previous transmit limit XmtSeqLmt that the NID was allowed to transmit previously, then the other machine has shrunk its receive window. This is an illegal condition because NID 4 could have already transmitted a packet and the packet could be in transit when the NID receives the ack that informs the NID that the packet just transmitted is too big. The value next window shrink NxtWinShr (line 1618) is therefore true if the next transmit limit NxtXmtLmt is less than the previous transmit limit XmtSeqLmt.

The numbers NxtXmtLmt and XmtSeqLmt are unsigned 32-bit numbers that wrap around. Comparing such unsigned wrap around numbers can be tricky. In line 1618, the two unsigned numbers are compared by comparing the difference between the two numbers to one quarter of the maximum sequence number (1G).

The next expression (!XmtAckVld & !XmtAckOld) of line 1713 involves a checking the acknowledge number in the receive packet to determine if the acknowledge number is a future acknowledge number. Accordingly, the expression is true if the received acknowledge number is not valid (see line 1611) AND if the acknowledge number is not an old acknowledge number (see line 1612).

The value FlushDet is the logical OR of these four expressions as indicated in lines 1712 and 1713. The logical OR is performed by combinatorial hardware logic in one period of the clock signal that clocks the socket engine SktEng. The values that are supplied as inputs to the combinatorial hardware logic are values output from: 1) the particular Tcb buffer of TcbBuf that is identified by ETcbId, and 2) the particular header buffer of HdrBuf that is identified by EHdrAd. The particular Tcb buffer values used to determine FlushDet are: 1) RcvSeqLmt (32-bit), 2) ExpRcvSeq (32-bit), 3) XmtSeqLmt (32-bit), 4) XmtAckNum (32-bit), and 5) XmtSeqNum (32-bit). The particular HdrBuf values used to determine FlushDet are: 1) PktRcvSeq (32 bit), 2) PktPaySz (16-bit), 3) PktXmtAck (32-bit), and 4) PktXmtWin (16-bit).

In the equations of FIGS. 13–16, the function of each logical operator is performed by a separate block of ALU-type hardware digital logic. As an example, the "+" operation can be performed by a digital adder made up of logic gates. The "−" operation can be performed by a digital subtractor made up of digital gates. The "==" operation can be performed by a digital comparator made up of digital gates.

TcbBuf is a dual port memory structure that organized to be as wide as the number of bits in a Tcb such that all the bits of one particular Tcb buffer are output simultaneously, the particular Tcb buffer being the Tcb buffer identified by the address value ETcbId. In the example of FIG. 2, TcbBuf is 256 bytes wide. DMA controller 25 writes to TcbBuf via a 32-bit wide port and a plurality of write strobes, whereas the TcbBuf interfaces with the socket engine SktEng via a 256 byte wide port.

HdrBuf is a dual port memory structure that is organized to be as wide as the number of bits in one particular header buffer, the particular header buffer being the header buffer identified by address value EHdrAd. In the example of FIG. 2, HdrBuf is 128 bytes wide. DRAM controller 26 writes to HdrBuf via a 32-bit wide port and a plurality of write strobes, whereas HdrBuf interfaces to the socket engine SktEng via a 128 byte wide read/write port.

State Update:

Rather than updating the state of the connection in the Tcb buffer sequentially as a series of writes of values to various places in the Tcb buffer memory, the connection state update occurs in a single period of the clock signal that clocks the socket engine SktEng state machine. The updating of the connection state occurs in line 1224 of FIG. 10 where all the tuple update TplUpd values (see FIG. 6) are loaded into appropriate fields of the Tcb buffer for the connection indicated by ETcbId. The values loaded are set forth in the description above of the socket engine SktEng and line 1224 of FIG. 10. To facilitate this tuple update operation, the Tcb buffer memory structure is organized to be at least as wide as the number of bits of one particular Tcb buffer such that all the TplUpd bits are written in parallel into the Tcb buffer at the same time.

Multi-Threaded Socket Engine:

The description of the socket engine SktEng above assumes that the socket engine sets up a DMA controller move, and that the move then occurs quickly such that the state machine can transition to another state upon the next state machine clock as if the move had already taken place. In one embodiment, the DMA controller move actually takes longer than one state machine clock cycle to complete. Rather than the socket engine SktEng waiting until the move has completed, the socket engine SktEng is a multi-threaded state machine that can process a first thread, instruct the DMA controller to perform a move, stop processing that first thread until the DMA controller move completes, process a second thread while the DMA controller is performing the move, and then return to processing of the first thread when the DMA controller completes the move. To jump from thread to thread, the socket engine internal register contents can be stored in the form of a context. There is one such a context for each thread. To move from a first thread to a second thread, the socket engine internal register contents are loaded into first context, and the contents of the second context are loaded into the socket engine internal registers. Regardless of whether the socket engine is multi-threaded or not, the socket engine SktEng sets up a DMA controller move in a single state machine state. The SktEng state machine therefore has a speed improvement over a conventional sequencer processor that would have to execute multiple instructions and perform several sequential operations in order to provide the source address of the move to the DMA controller, to provide the DMA controller an indication of how much data to move, to provide the DMA controller the destination address, and to initiate the move.

Although the present invention is described in connection with certain specific exemplary embodiments for instructional purposes, the present invention is not limited thereto. The functionality of the NID need not be implemented on an expansion card that couples to a host computer. Rather, the functionality of the NID can be embodied within a CPU chip set. The NID functionality may, for example, be embodied in the Northbridge or Southbridge chips of a Pentium chipset. The NID functionality is, one embodiment, embodied in a memory controller integrated circuit that has a first interface for coupling to memory and a second interface for coupling to a CPU. The NID functionality is, in another embodiment, embodied in an input/output controller integrated circuit that has a first interface for coupling to an CPU and other interfaces for coupling to I/O devices. Although the state machine is described above in connection with the receiving of packets for illustration purposes, additional state machine states perform transmit and timer functions associated with supporting the TCP protocol. The storing of TCP state variables and packets headers in a wide memory structure in such a way that these variables and headers are accessed at one time in parallel and are processed by a state machine, and such that the resulting updated TCP state variables are written back to the wide memory in parallel in one or a very small number of memory writes is applicable not only to systems where control of a TCP connection is passed back and forth between a TOE device and a host, but it is also applicable to systems where the TOE remains in control of a TCP connection and where control of the TCP connection is not transferred between the TOE and the host. Although the Tcb information and the packet header are stored in separate memories in the above-described example, the Tcb buffer and header buffer can be parts of the same memory. This single memory can can be addressed by TcbId. If the design allows for multiple packet headers to be queued for a Tcb, then the memory can be made wider to accommodate multiple packet headers. The Tcb is stored in a first portion of the memory, whereas the packet headers are stored in corresponding other portions of the memory. The Tcb and the associated packet headers are all output from the single memory in parallel at the same time. Which of the packet headers for the Tcb is supplied to the socket engine is determined by a multiplexer. HdrId serves as the multiplexer select value. Accordingly, various modifications, adaptations, and combinations of various features of the described embodiments can be practiced without departing from the scope of the invention as set forth in the following claims.

What is claimed is:

1. A TCP offload engine (TOE) capable of offloading, from a host, TCP protocol processing tasks that are associated with a TCP connection, the TOE comprising:
 a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;
 a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value; and
 combinatorial logic that receives said at least two TCP state values and said at least two packet header values and generates therefrom a flush detect signal indicative of whether an error condition has occurred, the two TCP state values and the two packet header values all being supplied to the combinatorial logic simultaneously.

2. A TCP offload engine (TOE) capable of offloading, from a host, TCP protocol processing tasks that are associated with a TCP connection, the TOE comprising:
 a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;
 a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value; and combinatorial logic that receives said at least two TCP state values and said at least two packet header values and generates therefrom a flush detect signal indicative of whether an error condition has occurred, the two TCP state values and the two packet header values all being supplied to the combinatorial logic simultaneously, wherein the TOE transfers the receive packet sequence limit, the expected receive packet sequence number, the transmit sequence limit, the transmit acknowledge number, and the transmit sequence number to the host if the flush detect signal is indicative of the error condition.

3. The TOE of claim 2, wherein the combinatorial logic is part of a state machine, the state machine being clocked by a clock signal, wherein the combinatorial logic generates said flush detect signal from said at least two TCP state values and said at least two packet header values within approximately one period of the clock signal.

4. The TOE of claim 3, wherein the state machine does not fetch instructions, decode the instructions, and execute the instructions.

5. The TOE of claim 4, wherein the state machine causes the expected packet receive sequence number and the receive packet sequence limit values in the first memory to be updated in a single period of the clock signal.

6. The TOE of claim 2, wherein the TCP connection was set up by a stack executing on the host, and wherein control of the TCP connection was then passed from the host to the TOE.

7. A TCP offload engine (TOE) capable of offloading, from a host, TCP protocol processing tasks that are associated with a TCP connection, the TOE comprising:

a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;

a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value; and combinatorial logic that receives said at least two TCP state values and said at least two packet header values and generates therefrom a flush detect signal indicative of whether an error condition has occurred, the two TCP state values and the two packet header values all being supplied to the combinatorial logic simultaneously, wherein the TOE can control a plurality of TCP connections, each of said TCP connections being associated with a TCB identifier, and wherein the first memory comprises a plurality of transaction control blocks (TCB), wherein the first memory can be addressed by a TCB identifier to access a TCB that contains TCP state information for a TCP connection associated with the TCB identifier.

8. The TOE of claim 7, wherein more than two values of the group of TCP state values are supplied simultaneously to the combinatorial logic, and wherein more than two values of the group of TCP state values are used to generate the flush detect signal.

9. The TOE of claim 7, wherein more than two values of the group of packet header values are supplied simultaneously to the combinatorial logic, and wherein more than two values of the group of packet header values are used to generate the flush detect signal.

10. A TCP offload engine (TOE) capable of offloading, from a host, TCP protocol processing tasks that are associated with a TCP connection, the TOE comprising:

a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;

a second memory that stores and simultaneously outputs at least two packet header values of a packet communicated over the TCP connection, wherein the at least two packet header values are taken from the group consisting of: a receive racket sequence number, a packet payload size, a packet acknowledge number, and a packet transmit window value; and combinatorial logic that receives said at least two TCP state values and said at least two packet header values and generates therefrom a flush detect signal indicative of whether an error condition has occurred, the two TCP state values and the two packet header values all being supplied to the combinatorial logic simultaneously, wherein the combinatorial logic is part of a state machine, the state machine being clocked by a clock signal, wherein the combinatorial logic generates said flush detect signal from said at least two TCP state values and said at least two packet header values within approximately one period of the clock signal, wherein the state machine does not fetch instructions, decode the instructions, and execute the instructions, and wherein a packet having a payload is received onto the TOE, the TOE further comprising:

a DMA controller that moves the payload from the TOE to the host using a source address value, a size value indicating an amount of information to move, and a destination address value, wherein the state machine causes the source address value, the size value, and the destination address value to be supplied to the DMA controller in a single state of the state machine.

11. A TCP offload engine (TOE) capable of offloading TCP protocol processing tasks from a host, the TCP protocol processing tasks being associated with a TCP connection, the TOE comprising:

a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;

a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value; and a hardware state machine that receives said at least two TCP state values and said at least two packet header values and generates therefrom a signal indicative of whether an exception condition has occurred, the two TCP state values and the two packet header values all being supplied to the hardware state machine simultaneously, wherein the hardware state machine is clocked by a clock signal, wherein the hardware state machine generates said signal from said at least two TCP state values and said at least two packet header values within approximately one period of the clock signal.

12. A TCP offload engine (TOE) capable of offloading TCP protocol processing tasks from a host, the TCP protocol processing tasks being associated with a TCP connection, the TOE comprising:
   a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;
   a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value; and
   a hardware state machine that receives said at least two TCP state values and said at least two packet header values and generates therefrom a signal indicative of whether an exception condition has occurred, the two TCP state values and the two packet header values all being supplied to the hardware state machine simultaneously, wherein the hardware state machine is clocked by a clock signal, wherein the hardware state machine generates said signal from said at least two TCP state values and said at least two packet header values within approximately one period of the clock signal, wherein the hardware state machine causes the expected packet receive sequence number and the receive packet sequence limit values in the first memory to be updated in a single period of the clock signal.

13. The TOE of claim 12, wherein the expected packet receive sequence number and the receive packet sequence limit values are updated by simultaneously writing the expected packet receive sequence number value and the receive packet sequence limit value into the first memory.

14. The TOE of claim 12, wherein the exception condition is a condition which results in control of the TCP connection being passed from the TOE to the host.

15. A TCP offload engine (TOE) capable of offloading TCP protocol processing tasks from a host, the TCP protocol processing tasks being associated with a TCP connection, the TOE comprising:
   a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;
   a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value; and
   a hardware state machine that receives said at least two TCP state values and said at least two packet header values and generates therefrom a signal indicative of whether an exception condition has occurred, the two TCP state values and the two packet header values all being supplied to the hardware state machine simultaneously, wherein the hardware state machine is clocked by a clock signal, wherein the hardware state machine generates said signal from said at least two TCP state values and said at least two packet header values within approximately one period of the clock signal, wherein the first memory is a dual-port memory that has a first interface and a second interface, the hardware state machine reading from and writing to the first memory via the first interface, and wherein information passes from the host and into the first memory via the second interface.

16. The TOE of claim 15, wherein the first memory comprises a plurality of TCB buffers, wherein one of the TCB buffers is associated with the TCP connection, and wherein a memory descriptor list entry associated with said TCP connection is stored in said TCB buffer associated with said TCP connection.

17. A TCP offload engine (TOE) capable of offloading TCP protocol processing tasks from a host, the TCP protocol processing tasks being associated with a TCP connection, the TOE comprising:
   a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;
   a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value;
   a hardware state machine that receives said at least two TCP state values and said at least two packet header values and generates therefrom a signal indicative of whether an exception condition has occurred, the two TCP state values and the two packet header values all being supplied to the hardware state machine simultaneously, wherein the hardware state machine is clocked by a clock signal, wherein the hardware state machine generates said signal from said at least two TCP state values and said at least two packet header values within approximately one period of the clock signal; and
   a third memory that stores a plurality of socket descriptors, wherein one of the socket descriptors is associated with the TCP connection.

18. A TCP offload engine (TOE) capable of offloading TCP protocol processing tasks from a host, the TCP protocol processing tasks being associated with a TCP connection, the TOE comprising:
   a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;

a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value;

a hardware state machine that receives said at least two TCP state values and said at least two packet header values and generates therefrom a signal indicative of whether an exception condition has occurred, the two TCP state values and the two packet header values all being supplied to the hardware state machine simultaneously, wherein the hardware state machine is clocked by a clock signal, wherein the hardware state machine generates said signal from said at least two TCP state values and said at least two packet header values within approximately one period of the clock signal, wherein the second memory outputs a parse value along with said at least two packet header values, said parse value being indicative of whether the transport and network layer protocols of an associated packet are the TCP and IP protocols.

19. A TCP offload engine (TOE) capable of performing TCP protocol processing tasks, the TCP protocol processing tasks being associated with a TCP connection, the TOE comprising:

a first memory that stores and simultaneously outputs at least two TCP state values associated with the TCP connection, wherein the at least two TCP state values are taken from the group consisting of: a receive packet sequence limit, an expected receive packet sequence number, a transmit sequence limit, a transmit acknowledge number, and a transmit sequence number;

a second memory that stores and simultaneously outputs at least two packet header values of a packet communicated over the TCP connection, wherein the at least two packet header values are taken from the group consisting of: a receive packet sequence number, a packet payload size, a packet acknowledge number, and a packet transmit window value; and a state machine that includes an amount of combinatorial logic, wherein the combinatorial logic receives said at least two TCP state values and said at least two packet header values and generates therefrom a signal indicative of whether an exception condition has occurred, the two TCP state values and the two packet header values all being supplied to the combinatorial logic simultaneously, and wherein the state machine causes the expected packet receive sequence number value and the receive packet sequence limit value in the first memory to be updated simultaneously.

20. The TOE of claim 19, wherein the TOE is capable of offloading the protocol processing tasks from a host processor, wherein the host processor performs exception protocol processing associated with the TCP connection if the exception condition has occurred.

21. The TOE of claim 20, wherein the first memory, the second memory and the state machine are all parts of a single integrated circuit.

22. The TOE of claim 21, wherein the first memory simultaneously outputs at least three TCP state values taken from the group consisting of: a receive packet sequence limit, an expected receive packet sequence number, a transmit sequence limit, a transmit acknowledge number, and a transmit sequence number, wherein the second memory simultaneously outputs at least three packet header values taken from the group consisting of: a receive packet sequence number, a packet payload size, a packet acknowledge number, and a packet transmit window value, and wherein said at least three TCP state values and said at least three packet header values are all supplied to the combinatorial logic simultaneously.

23. The TOE of claim 21, wherein the single integrated circuit is an integrated circuit of a CPU chip set.

\* \* \* \* \*

UNITED STATES PATENT AND TRADEMARK OFFICE
CERTIFICATE OF CORRECTION

PATENT NO.   : 6,996,070 B2
DATED        : February 7, 2006
INVENTOR(S)  : Starr et al.

It is certified that error appears in the above-identified patent and that said Letters Patent is hereby corrected as shown below:

<u>Column 34,</u>
Line 20, "racket" should be -- packet --.

Signed and Sealed this

Twenty-third Day of May, 2006

JON W. DUDAS
*Director of the United States Patent and Trademark Office*